United States Patent
Matousek

(10) Patent No.: US 11,102,143 B2
(45) Date of Patent: *Aug. 24, 2021

(54) SYSTEM AND METHOD FOR OPTIMIZING RESOURCE UTILIZATION IN A CLUSTERED OR CLOUD ENVIRONMENT

(71) Applicant: MessageOne, Inc., Austin, TX (US)

(72) Inventor: Jon Franklin Matousek, Austin, TX (US)

(73) Assignee: MessageOne, Inc., Austin, TX (US)

(*) Notice: Subject to any disclaimer, the term of this patent is extended or adjusted under 35 U.S.C. 154(b) by 54 days.

This patent is subject to a terminal disclaimer.

(21) Appl. No.: 16/259,965

(22) Filed: Jan. 28, 2019

(65) Prior Publication Data

US 2019/0230044 A1 Jul. 25, 2019

Related U.S. Application Data

(63) Continuation of application No. 15/283,715, filed on Oct. 3, 2016, now Pat. No. 10,193,820, which is a
(Continued)

(51) Int. Cl.
| | | |
|---|---|---|
| *H04L 12/923* | (2013.01) | |
| *H04L 12/911* | (2013.01) | |
| *G06F 9/48* | (2006.01) | |

(52) U.S. Cl.
CPC .......... *H04L 47/762* (2013.01); *H04L 47/788* (2013.01); *H04L 47/822* (2013.01); *G06F 9/4881* (2013.01)

(58) Field of Classification Search
None
See application file for complete search history.

(56) References Cited

U.S. PATENT DOCUMENTS 7,606,154 B1 * 10/2009 Lee ........................ H04J 3/14
370/232
8,612,330 B1 * 12/2013 Certain ................. G06Q 30/06
705/37

(Continued)

OTHER PUBLICATIONS

Amendment under 37 C.F.R. § 1.312 dated Dec. 13, 2018, as filed in U.S. Appl. No. 15/283,715, pp. 1-14.
(Continued)

*Primary Examiner* — Lewis A Bullock, Jr.
*Assistant Examiner* — Melissa A Headly

(57) ABSTRACT

In one embodiment, a method includes calculating ideal resource apportionments from a current set of consumable resources for each of a plurality of reservations. Each reservation corresponds to one of a plurality of customers. The method further includes running an apportionment process relative to the plurality of reservations. The running includes attempting to apportion to each reservation its ideal resource apportionment. The running yields an actual resource apportionment for each reservation. Each customer's actual resource apportionment comprises a sum of the actual resource apportionments for the customer's reservations. In addition, the method includes, responsive to an indication of unapportioned resources following the running, performing a first optimization to increase resource utilization by at least one needy customer.

20 Claims, 20 Drawing Sheets

Related U.S. Application Data continuation of application No. 13/747,462, filed on Jan. 22, 2013, now Pat. No. 9,491,114, which is a continuation-in-part of application No. 13/690,495, filed on Nov. 30, 2012, now Pat. No. 9,158,591, and application No. 13/747,462, Jan. 22, 2013, which is a continuation-in-part of application No. 13/690,526, filed on Nov. 30, 2012.

(60) Provisional application No. 61/717,798, filed on Oct. 24, 2012.

(56) References Cited

U.S. PATENT DOCUMENTS

2011/0314477 A1* 12/2011 Zhong .................... G06F 9/505
  718/103
2012/0096468 A1* 4/2012 Chakravorty ............ G06F 9/50
  718/103

OTHER PUBLICATIONS

Notice of Allowance dated Sep. 13, 2018, mailed in U.S. Appl. No. 15/283,715, pp. 1-29.
Response to Notice of Non-Compliant Amendment of Non-Final Office Action dated Feb. 6, 2018, mailed in U.S. Appl. No. 15/283,715, filed May 8, 2018, pp. 1-14.
Terminal Disclaimer and Decision dated Feb. 7, 2018, mailed in U.S. Appl. No. 15/283,715, pp. 1-3.
Response to Non-Final Office action dated Sep. 6, 2017, as filed in U.S. Appl. No. 15/283,715, filed Feb. 6, 2018, pp. 1-14.
Non-Final Office action dated Sep. 6, 2017, mailed in U.S. Appl. No. 15/283,715, pp. 1-19.

* cited by examiner

SYSTEM AND METHOD FOR OPTIMIZING RESOURCE UTILIZATION IN A CLUSTERED OR CLOUD ENVIRONMENT

CROSS-REFERENCE TO RELATED APPLICATIONS

This patent application claims priority from U.S. Provisional Patent Application No. 61/717,798 filed on Oct. 24, 2012. This patent application is a continuation-in-part of U.S. patent application Ser. No. 13/690,495 filed on Nov. 30, 2012. This patent application is also a continuation-in-part of U.S. patent application Ser. No. 13/690,526 filed on Nov. 30, 2012. This patent application incorporates by reference the entire disclosures of U.S. Provisional Patent Application No. 61/717,798, U.S. patent application Ser. No. 13/690, 495, and U.S. patent application Ser. No. 13/690,526.

BACKGROUND

Technical Field

The present invention relates generally to scheduling and more particularly, but not by way of limitation, to systems and methods for controlled sharing of consumable resources in a computer cluster.

History of Related Art

A multi-tenant computer cluster such as, for example, a Software as a Service (SaaS) cloud, often uses computing resources (e.g., hardware and software resources) to perform services for customers. The computing resources can include, for example, computers (e.g., physical computers or virtual machines (VMs)), raw (block) and file-based storage, firewalls, load balancers, internet protocol (IP) addresses, virtual local area networks (VLANs), software bundles, and computing platforms that typically include an operating system, a programming-language execution environment, a database, and a web server. Services generally involve use of at least a portion of the computing resources for the benefit of the customer. The services can include, for example, emergency notification, accounting, collaboration, customer relationship management (CRM), management information systems (MIS), enterprise resource planning (ERP), invoicing, human resource management (HRM), content management (CM), service-desk management, and/or many other services.

Oftentimes, the multi-tenant computer cluster receives customer requests for service randomly responsive to needs that arise unpredictably. In addition, the customer requests for service frequently spawn other requests for service. Therefore, all requests are traditionally managed in a queue and serviced in a first-in first-out (FIFO) manner. As the queue becomes backlogged, the FIFO manner of servicing results in an unequal distribution of the computing resources across customers. Because the requests are serviced sequentially, customers with more requests are awarded a greater share of the computing resources than customers with fewer requests. The distribution of the computing resources across all customers is not generally controllable.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on a computer cluster comprising a plurality of computers, calculating ideal resource apportionments from a current set of consumable resources for each of a plurality of reservations. Each reservation corresponds to one of a plurality of customers. Each customer's ideal resource apportionment comprises a sum of the ideal resource apportionments for the customer's reservations. The method further includes running an apportionment process relative to the plurality of reservations. The running includes attempting to apportion to each reservation its ideal resource apportionment. The running yields an actual resource apportionment for each reservation. Each customer's actual resource apportionment comprises a sum of the actual resource apportionments for the customer's reservations. In addition, the method includes, responsive to an indication of unapportioned resources following the running, performing a first optimization to increase resource utilization by at least one needy customer. The at least one needy customer comprises one or more customers whose actual resource apportionments are less than their ideal resource apportionments.

In one embodiment, an information handling system includes a computer cluster comprising a plurality of computers. The computer cluster is operable to calculate ideal resource apportionments from a current set of consumable resources for each of a plurality of reservations. Each reservation corresponds to one of a plurality of customers. Each customer's ideal resource apportionment comprises a sum of the ideal resource apportionments for the customer's reservations. In addition, the computer cluster is operable to run an apportionment process relative to the plurality of reservations. The running includes attempting to apportion to each reservation its ideal resource apportionment. The run yields an actual resource apportionment for each reservation. Each customer's actual resource apportionment includes a sum of the actual resource apportionments for the customer's reservations. Further, the computer cluster is operable to, responsive to an indication of unapportioned resources following the running, perform a first optimization to increase resource utilization by at least one needy customer. The at least one needy customer includes one or more customers whose actual resource apportionments are less than their ideal resource apportionments.

In one embodiment, a computer-program product includes a computer-usable medium having computer-readable program code embodied therein, the computer-readable program code adapted to be executed to implement a method. The method includes calculating ideal resource apportionments from a current set of consumable resources for each of a plurality of reservations. Each reservation corresponds to one of a plurality of customers. Each customer's ideal resource apportionment comprises a sum of the ideal resource apportionments for the customer's reservations. The method further includes running an apportionment process relative to the plurality of reservations. The running includes attempting to apportion to each reservation its ideal resource apportionment. The running yields an actual resource apportionment for each reservation. Each customer's actual resource apportionment comprises a sum of the actual resource apportionments for the customer's reservations. In addition, the method includes, responsive to an indication of unapportioned resources following the running, performing a first optimization to increase resource utilization by at least one needy customer. The at least one needy customer comprises one or more customers whose actual resource apportionments are less than their ideal resource apportionments.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
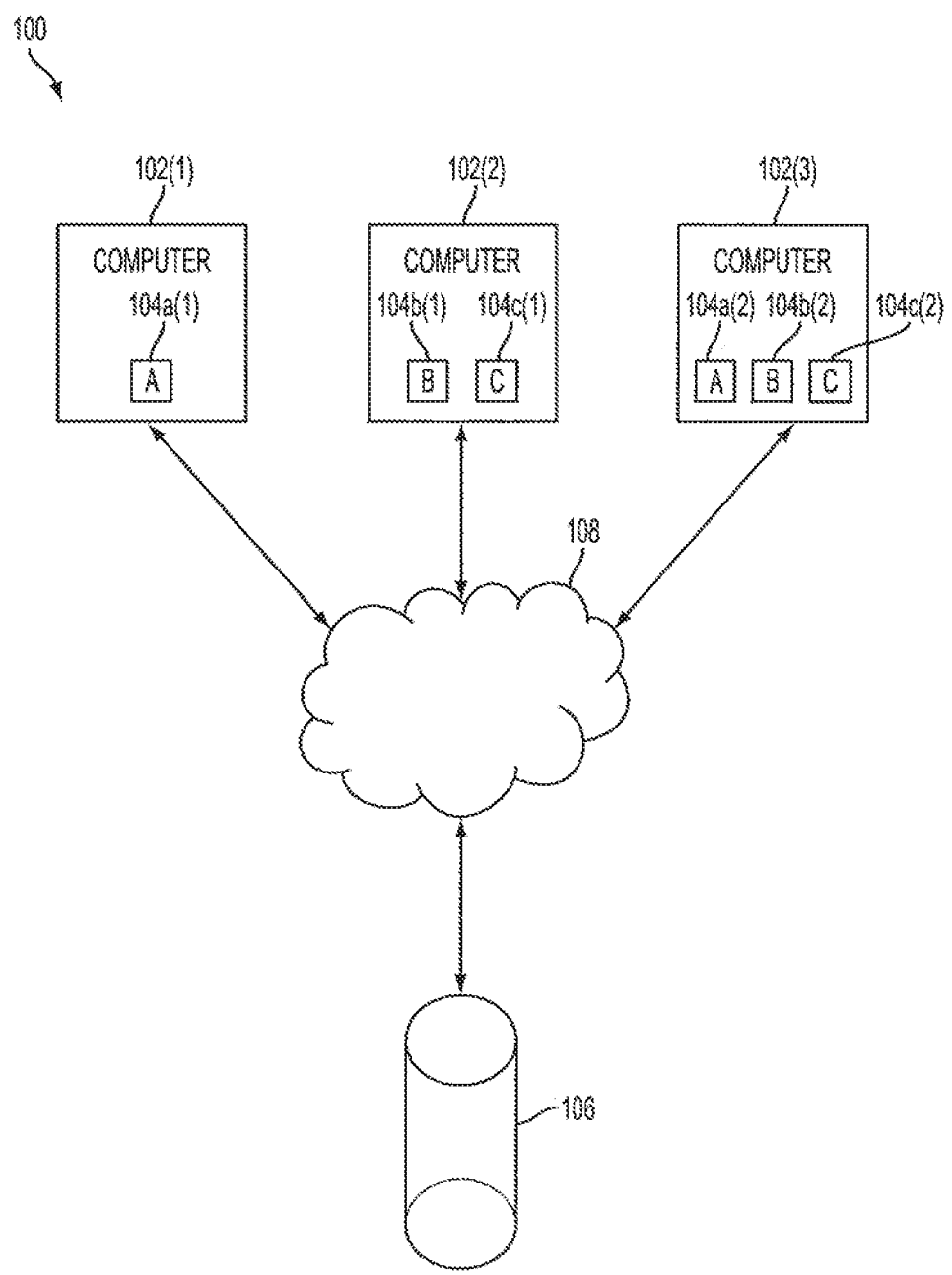
FIG. 1 illustrates a computer cluster.

In various embodiments, customers can be served more equitably and controllably using systems and methods described herein. In a typical embodiment, flow control is instituted on a computer cluster by defining a class of consumable resources and establishing a framework governing utilization of the consumable resources by customers. For purposes of this patent application, a computer cluster is a set of loosely-connected computers, virtual or physical, that work together such that the computers can be viewed as a single system. In various embodiments, a computer cluster can provide a cloud environment such as, for example, a SaaS cloud environment.

A consumable resource, as used herein, refers to a limited resource that is accessible to a computer cluster. For example, consumable resources can include, but are not limited to, available memory, central processing units (CPUs), free space on a file system, network bandwidth, floating software licenses, voice-port hardware (e.g., text-to-speech voice ports) and access to a computing process. For simplicity, consumable resources may be referenced periodically herein as resources. In particular, with respect to access to a computing process, the computing process may be, for example, a bottleneck point in an overall business process. It should be appreciated that consumable resources can be either internal or external to a given computer cluster. It should further be appreciated that consumable resources can also be used to abstract human workflow. For example, in some embodiments, principles described herein are implemented in a call center that receives incoming calls to be serviced by call-center employees. In these embodiments, either the call-center employees or voice-communication channels staffed by such employees can be considered consumable resources that are controlled and managed as described herein.

A service, as used herein, is a semantic process or a combination of semantic processes that can be performed for the benefit of a customer. Services are generally requested by customers. A semantic process, as used herein, refers to one or more tasks performed by a computer. Tasks of a given task type, which can span multiple semantic processes, may utilize one or more consumable resources from a specific class of consumable resources. A class of consumable resources, as used herein, refers to an aggregation of like consumable resources that can fulfill a resource need, for example, of the given task type. In such cases, a flow-control instance can be utilized to control sharing of the specific class of consumable resources relative to tasks of the given task type. For example, a class of consumable resource could include a batch of tasks or task groups that can be executed at a given time or allowed to access a computing process. A flow-control instance, as used herein, is software that is configured to manage and control sharing of a particular class of consumable resources among a plurality of customers.

FIG. 1 illustrates a computer cluster 100 that is operable to provide one or more services to customers. The computer cluster 100 includes a computer 102(1), a computer 102(2), a computer 102(3), and a database 106. For convenient reference, the computer 102(1), the computer 102(2), and the computer 102(3) may be referenced collectively as computers 102. In various embodiments, the computers 102 can be virtual computers, physical computers, or a combination thereof. For illustrative purposes, the computers 102 are shown to include the computer 102(1), the computer 102(2), and the computer 102(3). However, one of ordinary skill in the art will appreciate that, in practice, the computers 102 can include any number of physical and/or virtual computers. As shown, the computers 102 and the database 106 are operable to communicate over a network 108.

In a typical embodiment, each of the computers 102 is operable to execute one or more semantic processes related to the provision of the one or more services by the computer cluster 100. In particular, the computer 102(1) executes a process 104a(1), the computer 102(2) executes a process 104b(1) and a process 104c(1), and the computer 102(3) executes a process 104a(2), a process 104b(2), and a process 104c(2). In a typical embodiment, the process 104a(1) and the process 104a(2) are identical processes that have been replicated on each of the computer 102(1) and the computer 102(3), respectively. Likewise, the process 104(b)(1) and the process 104(b)(2) are identical processes that have been replicated on each of the computer 102(2) and the computer 102(3), respectively. Similarly, the process 104(c)(1) and the process 104(c)(2) are identical processes that have been replicated on each of the computer 102(2) and the computer 102(3), respectively.

Operationally, the one or more services provided by the computer cluster 100 can be initiated in a variety of ways. For example, in a typical embodiment, services can be requested by one of the customers via, for example, an interface provided over a public network such as, for example, the Internet. Once a service is initiated, the initiated service may encompass semantic processes selected from the processes 102(a)(1), 102(a)(2), 102(b)(1), 102(b)(2), 102(c)(1), and 102(c)(2). The semantic processes of the initiated service generally include tasks to be executed by the computers 102. In various embodiments, each service, semantic process, and task can spawn other services, semantic processes, and tasks, respectively, so that the initiated service results, for example, in many thousands of tasks. In a typical embodiment, some of those tasks may be of a task type that requires access to a specific class of consumable resources. In various embodiments, the computer cluster 100 controls sharing of the specific class of consumable resources via a flow-control instance that is executed on one or more of the computers 102. Examples of flow-control instances that may be utilized will be described with respect to the ensuing Figures.

Figure 2:
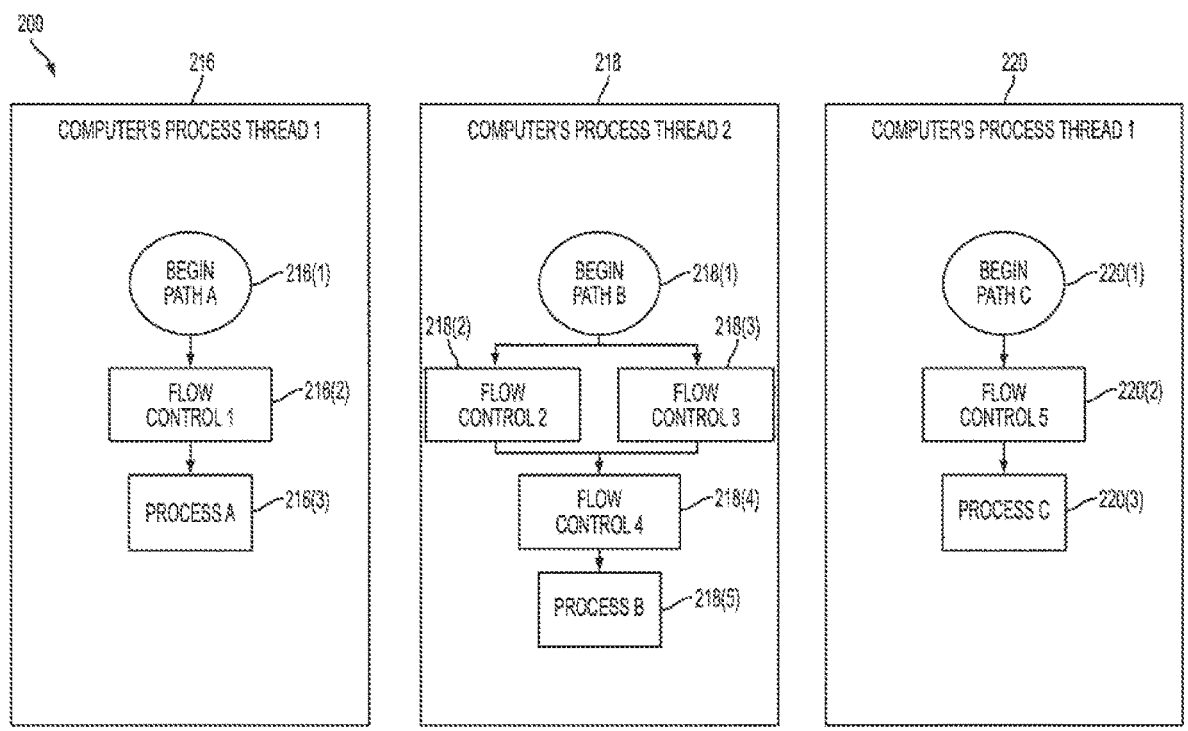
FIG. 2 illustrates a flow-control scheme.

FIG. 2 illustrates a flow-control scheme 200 involving process threads 216, 218, and 220. The flow-control scheme 200 illustrates that flow-control instances generally serve a gating function. The process threads 216, 218, and 220 each represent business logic that may be executed in parallel by a computer cluster such as, for example, the computer cluster 100 of FIG. 1, in the provision of one or more services to a customer. The process threads 216, 218, and 220 can each include one or more semantic processes, which semantic processes can each further include one or more tasks.

The process thread 216 includes a logical path 216(1), a flow-control instance 216(2), and a semantic process 216(3). As shown, flow of the process thread 216 is gated by the flow-control instance 216(2). The flow-control instance 216(2) controls access to a class of consumable resources needed by a task of the process thread 216. Therefore, forward progress in the process thread 216, and execution of the semantic process 216(3), is conditioned upon the flow-control instance 216(2) providing consumable-resource access to the task and the task executing. After the task has executed, the semantic process 216(3) can be initiated.

The process thread 218 includes a logical path 218(1), a flow-control instance 218(2), a flow-control instance 218(3), a flow-control instance 218(4), and a semantic process 218(5). As shown, flow of the process thread 218 is gated by the flow-control instances 218(2), 218(3), and 218(4). The flow-control instances 218(2), 218(3), and 218(4) each control access to a distinct class of consumable resources needed by three distinct tasks of the process thread 218. For purposes of illustration, the flow-control instances 218(2), 218(3), and 218(4) may be considered to represent a first task, a second task, and a third task, respectively. Initially, forward progress in the process thread 218 is conditioned upon: (1) the first task being granted resource access by the flow-control instance 218(2) and executing; and (2) the second task being granted resource access by the flow-control instance 218(3) and executing. Therefore, as shown, the third task cannot execute until the first task and the second task are granted consumable-resource access by the flow-control instances 218(2) and 218(3), respectively, and execute.

Once the first task and the second task have executed, forward progress in the process thread 218, and execution of the semantic process 218(5), is conditioned upon the flow-control instance 218(4) providing consumable-resource access to the third task and the third task executing. After the third task has executed, the semantic process 218(5) can be initiated. In that way, the process thread 218 utilizes three flow-control instances in the provision of the one or more services.

The process thread 220 includes a logical path 220(1), a flow-control instance 220(2), and a semantic process 220(3). As shown, flow of the process thread 220 is gated by the flow-control instance 220(2). The flow-control instance 220(2) controls access to a class of consumable resources needed by a task of the process thread 220. Therefore, forward progress in the process thread 220, and execution of the semantic process 220(3), is conditioned upon the flow-control instance 220(2) providing consumable-resource access to the task and the task executing. After the task has executed, the semantic process 220(3) can be initiated.

Figure 3:
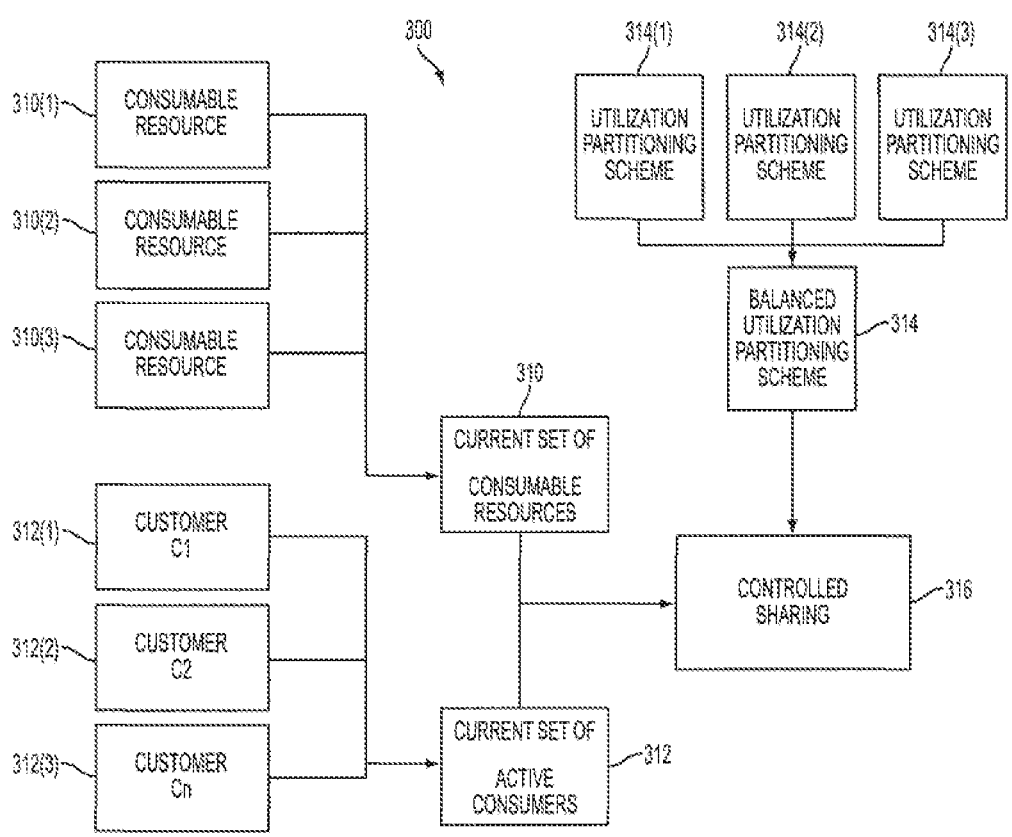
FIG. 3 illustrates a flow-control instance.

FIG. 3 illustrates a flow-control instance 300 that may be implemented on a computer cluster such as, for example, the computer cluster 100 of FIG. 1. The flow-control instance 300 performs controlled sharing 316 of a current set of consumable resources 310 for a given task type being managed by the flow-control instance 300 (hereinafter, "managed task type"). The current set of consumable resources 310 corresponds to a class of consumable resources required by the managed task type. The flow-control instance 300 enforces the controlled sharing 316 among a current set of active customers 312 according to a balanced-utilization partitioning scheme 314. In a typical embodiment, the flow-control instance 300 is resident and executing on at least one computer of the computer cluster.

In a typical embodiment, the flow-control instance 300 manages tasks of the managed task type by grouping tasks into reservations. For example, each reservation can include those tasks that have a same task key. The task key usually defines a set of characteristics that justify grouping tasks into a same reservation. The set of characteristics can include, for example, a service ID for a requested service with which the task is associated, a customer ID corresponding to a requesting customer, a priority level assigned to the task, a resource profile, and the like. Reservations will be described in greater detail with respect to the ensuing Figures.

In a typical embodiment, the current set of consumable resources 310 includes a defined quantity of consumable resources for which the flow-control instance 300 is responsible for enforcing the controlled sharing 316. The defined quantity can dynamically change during execution of the flow-control instance 300. For example, consumable resources may become available or unavailable to the flow-control instance 300 and, correspondingly, be included in or excluded from the current set of consumable resources 310. For illustrative purposes, the current set of consumable resources 310 is shown to include consumable resources 310(1), 310(2), and 310(3), which resources may be considered to represent an exemplary snapshot-in-time of the current set of consumable resources 310.

The current set of active customers 312 includes customers that, at a given point in time, have at least one reservation of the managed task type that has not been processed to completion by the computer cluster (i.e., customers having active reservations). In a typical embodiment, the current set of active customers 312 changes dynamically during execution of the flow-control instance 300. As new requests for service are received and corresponding reservations are created, customers who do not already have at least one active reservation of the managed task type are added to the current set of active customers 312. As reservations are processed to completion, customers having no active reservations of the managed task type are removed from the current set of active customers 312.

The balanced-utilization partitioning scheme 314 establishes how the current set of consumable resources 310 should be distributed to and consumed by the current set of active customers 312. More particularly, the balanced-utilization partitioning scheme 314 defines logical partitions relative to a totality of the current set of consumable resources 310. Each logical partition of the balanced-utilization partitioning scheme 314 is assigned a resource percentage representing a proportion of a given set of consumable resources (e.g., the current set of consumable resources 310 or a subset thereof) that, ideally, should be allocated to the logical partition. For example, in various embodiments, a total number of partitions may equal a number of active customers in the current set of active customers 312. In various other embodiments, customers may be allowed to prioritize their tasks. In these embodiments, the total number of partitions could vary between the total number of active customers and the total number of active customers multiplied by a total number of priority levels enabled by the flow-control instance.

For illustrative purposes, the balanced-utilization partitioning scheme 314 is shown to include partitioning schemes 314(1), 314(2), and 314(3), which schemes may be considered an exemplary snapshot-in-time of the balanced-utilization partitioning scheme 314. Like the current set of consumable resources 310 and the current set of active customers 312, the balanced-utilization partitioning scheme 314 dynamically changes during execution of the flow-control instance 300 based on, for example, the current set of active customers 312 and a current set of active reservations of the managed task type. As the balanced-utilization partitioning scheme 314 changes, new resource percentages are computed and assigned.

Figure 4:
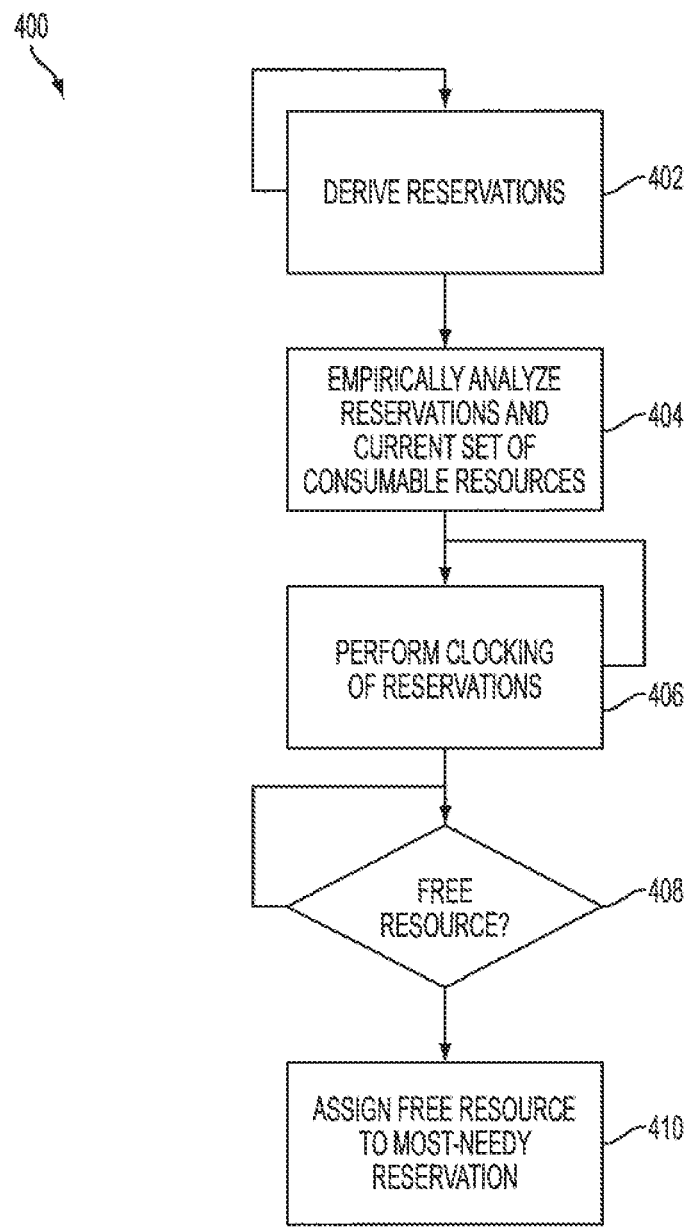
FIG. 4 illustrates a process that may be executed by a flow-control instance.

FIG. 4 illustrates a process 400 that may be executed, for example, by a flow-control instance that is resident and executing on at least one computer of a computer cluster. Various portions of the process 400 may be executed as part of the controlled sharing 316 of FIG. 3. It should be appreciated that steps 402-410 of the process 400 are shown to execute sequentially for purposes of illustrating how tasks logically progress from being grouped into reservations to being assigned free resources. Although the process 400 can execute sequentially as shown, in a typical embodiment, steps 402-410 each represent subprocesses that execute in parallel on the computer cluster. In addition, as described below, various steps of the process 400 execute continuously to control sharing of a current set of consumable resources among a current set of active reservations. The process 400 begins at step 402.

At step 402, the flow-control instance derives reservations. Derivation of reservations involves grouping tasks that have, for example, a same task key, into reservations. As indicated, step 402 executes repeatedly due to constant creation of new tasks of a managed task type. Derivation of reservations will be described in greater detail with respect to FIG. 5. After each execution of step 402, the process 400 proceeds to step 404. At step 404, the flow-control instance empirically analyzes the current set of active reservations and the current set of consumable resources. In a typical embodiment, step 404 yields a balanced-utilization partitioning scheme such as, for example, the balanced-utilization partitioning scheme 314 of FIG. 3. Examples of empirical analysis that can occur at step 402 will be described in greater detail with respect to FIGS. 6-12. After execution of step 404, the process 400 proceeds to step 406.

At step 406, the flow-control instance performs clocking of the current set of active reservations. In a typical embodiment, the flow-control instance maintains a virtual clock that, every clocking cycle, initiates a virtual pendulum for each reservation of the current set of active reservations. The clocking cycle can be, for example, a configurable unit of wall time (e.g., seconds or milliseconds) or a configurable number of CPU cycles. The initiation of the virtual pendulums results in each reservation being "clocked" according to a flow-control clocking weight that is specific to the reservation. Clocking of reservations will be described in more detail with respect to FIGS. 13-14. As indicated, step 406 executes repeatedly for each clocking cycle. After step 406, the process 400 proceeds to step 408.

At step 408, the flow-control instance determines whether a consumable resource of the current set of consumable resources is free (i.e., available for use). Whenever a consumable resource is free, the process 400 proceeds to step 410. As indicated in FIG. 4, once initiated, step 408 executes continuously as long as reservations exist in the priority queue and there are free resources available to assign. At step 410, the flow-control instance assigns the free consumable resource to a most-needy resource in the priority queue. Examples of activities that can occur at steps 408 and 410 will be described in greater detail with respect to FIGS. 15-16. After step 410, the process 400 ends.

Figure 5:
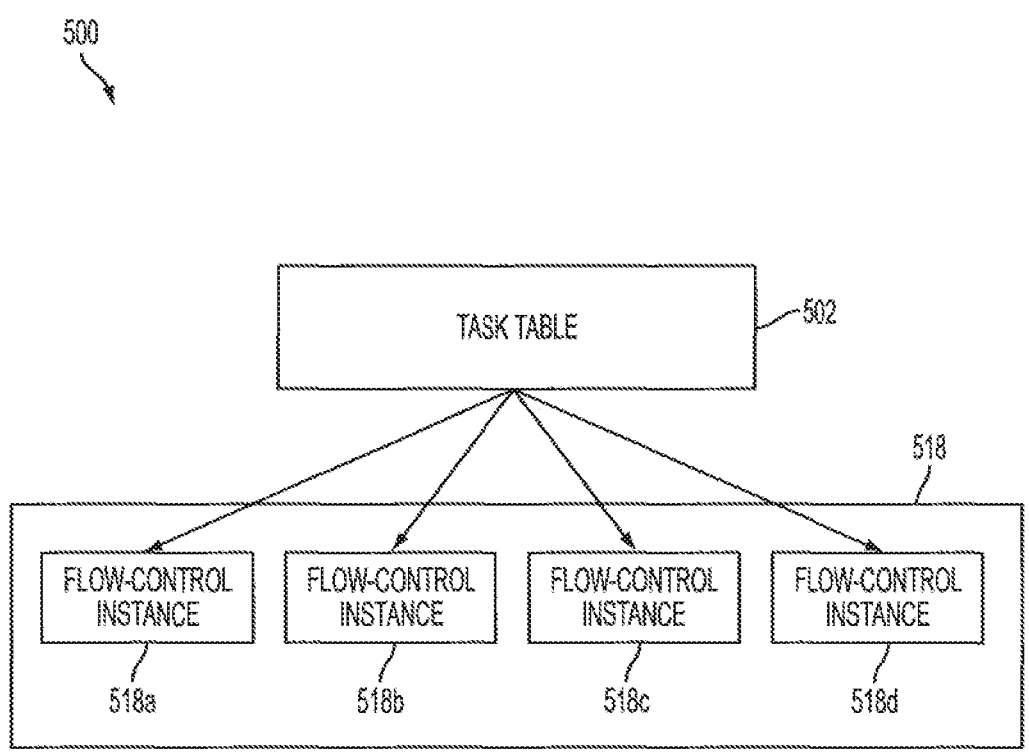
FIG. 5 illustrates a derivation of reservations from tasks.

FIG. 5 illustrates a derivation 500 that can be used to derive reservations from tasks. The derivation 500 illustrates functionality that, in a typical embodiment, can be performed as part of step 402 of FIG. 4. One or more flow-control instances 518 are shown to derive reservations from a task table 502. For purposes of illustration, the one or more flow-control instances 518 are shown to include a flow-control instance 518a, a flow-control instance 518b, a flow-control instance 518c, and a flow-control instance 518d. In a typical embodiment, the task table 502 is a comprehensive listing of all tasks in a computer cluster such as, for example, the computer cluster 100 of FIG. The task table 502 is typically maintained separately from any given flow-control instance. The task table 502 is regularly updated to add new tasks that are created and to remove tasks that have been completed.

The one or more flow-control instances 518 manage tasks of a managed task type as described with respect to FIG. 2. Tasks having a same task key, as determined by information from the task table, are grouped into a common reservation. As described above, the task key usually defines a set of characteristics that justify grouping tasks into a same reservation. The set of characteristics can include, for example, a service ID for a requested service with which the task is associated, a customer ID corresponding to a requesting customer, a priority level assigned to the task, a resource profile, and the like.

In a typical embodiment, flow-control performance can be enhanced when, as illustrated, the one or more flow-control instances 518 include more than one flow-control instance to manage tasks of the managed task type. In these embodiments, flow control is distributed across the one or more flow-control instances 518, with each flow-control instance operating to derive reservations and perform flow control in a similar fashion. It should be appreciated that the one or more flow-control instances 518 need not perform steps of a process such as, for example, the process 400 of FIG. 4, at identical intervals. Rather, each flow-control instance can execute such a process independently and thus derive reservations at different intervals. The task table 502 operates as a common source of tasks for the one or more flow-control instances 518. Each of the flow-control instances 518 can be viewed as a cooperative force that results in resources being assigned to reservations derived from the task table 502. Therefore, when flow control for the managed task type is distributed as illustrated in FIG. 5, this cooperative effect causes the one or more flow-control instances 518 to exhibit the emergent property.

FIGS. 6-12 illustrate empirical analysis of reservations in greater detail. In a typical embodiment, functionality described with respect to FIGS. 6-12 can be performed as part of step 404 of the process 400 of FIG. 4. Empirical analysis typically includes generation of a balanced-utilization partitioning scheme such as, for example, the balanced-utilization partitioning scheme 314 of FIG. 3. In a typical embodiment, the balanced-utilization partitioning scheme utilizes principles of stationary distributions. As used herein, a stationary distribution refers to a set of values that sum to one. As described below, the values can be, for example, percentages of a set of consumable resources. For purposes of this description, the stationary distribution of one represents one-hundred percent of a given set or subset of consumable resources. In that way, as described below, a balance of resource consumption can be precisely maintained.

Figure 6:
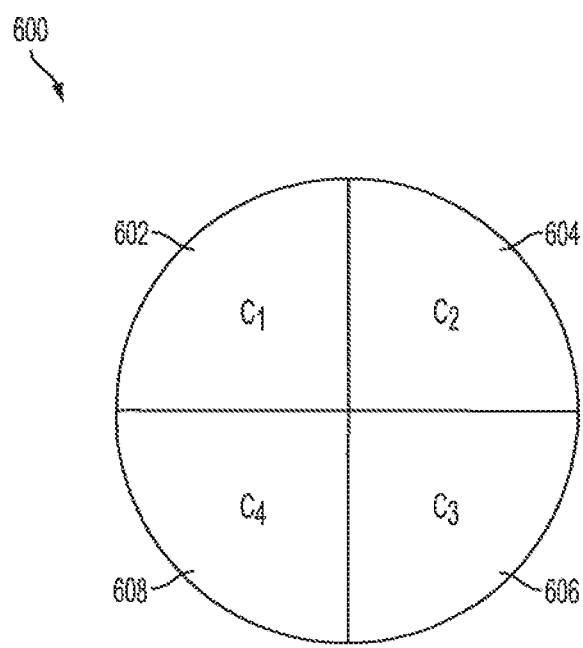
FIG. 6 illustrates an exemplary balanced-utilization partitioning scheme.

FIG. 6 illustrates an exemplary balanced-utilization partitioning scheme 600 that may be utilized by a flow-control instance. For example, the balanced-utilization partitioning scheme 600 may be implemented as the balanced-utilization partitioning scheme 314 of FIG. 3. The balanced-utilization partitioning scheme 600 includes a partition 602, a partition 604, a partition 606, and a partition 608 that each correspond to an active customer (i.e., four active customers). According to the balanced-utilization scheme 600, all active customers at a given a point in time share a class of consumable resources equally.

Figure 7:
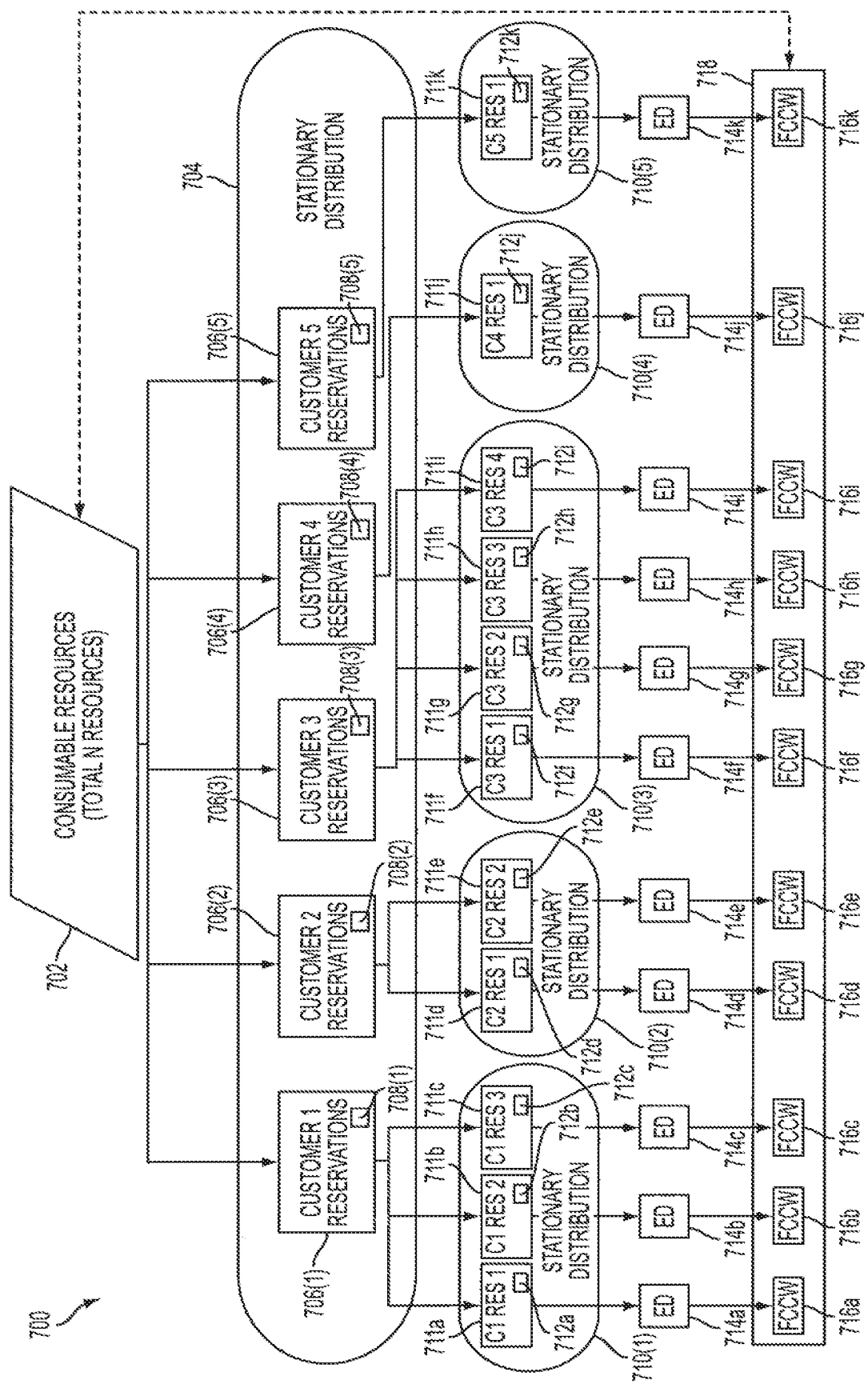
FIG. 7 illustrates an implementation of a balanced-utilization partitioning scheme.

FIG. 7 illustrates an implementation 700 of the balanced-utilization partitioning scheme 600 of FIG. 6. The implementation 700 includes a current set of consumable resources 702 that is apportioned among customer-specific reservation sets 706(1), 706(2), 706(3), 706(4), and 706(5) (collectively, customer-specific reservation sets 706). As shown, the current set of consumable resources 702 is apportioned to the customer-specific reservation sets 706 according to a stationary distribution 704. The current set of consumable resources 702 includes N resources.

Each of the customer-specific reservation sets 706 is an aggregation of active reservations for a particular customer (for each of five customers as shown). In particular, the customer-specific reservation set 706(1) includes reservations 711a, 711b, and 711c. The customer-specific reservation set 706(2) includes reservations 711d and 711e. The customer-specific reservation set 706(3) includes reservations 711f, 711g, 711h, and 711i. The customer-specific reservation set 706(4) includes reservation 711j. Finally, the customer-specific reservation set 706(5) includes reservation 711k. For convenient reference, the reservations 711a-k may be referenced collectively as reservations 711.

The stationary distribution 704 functions to distribute customer-specific resource percentages 708(1), 708(2), 708(3), 708(4), and 708(5) to the customer-specific reservation sets 706(1), 706(2), 706(3), 706(4), and 706(5), respectively. For convenient reference, the customer-specific resource percentages 708(1)-708(5) may be referenced collectively as customer-specific resource percentages 708. In compliance with the stationary distribution 704, the customer-specific resource percentages 708 are values that, when summed, equal one. For example, when applying the balanced-utilization scheme 600 of FIG. 6, the current set of consumable resources 702 is apportioned equally. According to this example, each of the customer-specific reservation sets 708 is apportioned one-fifth of the current set of consumable resources 702. As such, each of the customer-specific resource percentages 708 would equal 0.2 in decimal form.

After the stationary distribution 704 is applied, stationary distributions 710(1), 710(2), 710(3), 710(4), and 710(5) are applied (collectively, stationary distributions 710). The stationary distributions 710 apportion the customer-specific resource percentages 708 to individual reservations of the customer-specific reservation sets 706. More particularly, the stationary distributions 710(1), 710(2), 710(3), 710(4), and 710(5) serve to distribute reservation-specific resource percentages 712a-712c, 712d-712e. 712f-712i, 712j, and 712k, respectively. In a typical embodiment, the stationary distributions 710 effect an equal apportionment of the customer-specific resource percentages 708 across each reservation set of the customer-specific reservation sets 706.

More particularly, the stationary distribution 710(1) apportions the customer-specific resource percentage 708(1) to the reservations 711a-711c (i.e., the customer-specific reservation set 706(1)). In this fashion, the reservation-specific resource percentages 712a. 712b, and 712c are distributed to the reservations 711a. 711b, and 711c, respectively. The reservation-specific resource percentages 712a-712c thereby represent proportions of the customer-specific resource percentage 708(1) that, according to the stationary distribution 710(1), collectively sum to one.

The stationary distribution 710(2) apportions the customer-specific resource percentage 708(2) to the reservations 711d-711e (i.e., the customer-specific reservation set 706(2)). In this fashion, the reservation-specific resource percentages 712d and 712e are distributed to the reservations 711d and 711e, respectively. The reservation-specific resource percentages 712d and 712e thereby represent proportions of the customer-specific resource percentage 708(2) that, according to the stationary distribution 710(2), collectively sum to one.

The stationary distribution 710(3) apportions the customer-specific resource percentage 708(3) to the reservations 711f-711i (i.e., the customer-specific reservation set 706(3)). In this fashion, the reservation-specific resource percentages 712f, 712g, 712h, and 712i are distributed to the reservations 711f, 711g, 711h, and 711i, respectively. The reservation-specific resource percentages 712f-712i thereby represent proportions of the customer-specific resource percentage 708(3) that, according to the stationary distribution 710(3), collectively sum to one.

The stationary distribution 710(4) apportions the customer-specific resource percentage 708(4) to the reservation 711$j$ (i.e., the customer-specific reservation set 706(4)). In this fashion, the reservation-specific resource percentage 712$j$ is distributed to the reservation 711$j$. The reservation-specific resource percentage 712$j$ thereby represents a proportion of the customer-specific resource percentage 708(4). Since the customer-specific reservation set 706(4) includes only the reservation 711$j$, according to the stationary distribution 710(4), the reservation-specific resource percentage 712$j$ will generally equal one.

The stationary distribution 710(5) apportions the customer-specific resource percentage 708(5) to the reservation 711$k$ (i.e., the customer-specific reservation set 706(5)). In this fashion, the reservation-specific resource percentage 712$k$ is distributed to the reservation 711$k$. The reservation-specific resource percentage 712$k$ thereby represents a proportion of the customer-specific resource percentage 708(5). Since the customer-specific reservation set 706(5) includes only the reservation 711$k$, according to the stationary distribution 710(5), the reservation-specific resource percentage 712$k$ will generally equal one.

In a typical embodiment, the stationary distributions 710 effect an equal distribution of the customer-specific resource percentages 708 across each reservation set of the customer-specific reservation sets 706. For example, the customer-specific reservation set 706(1) includes three reservations, i.e., the reservations 711$a$, 711$b$, and 711$c$. The reservation-specific resource percentages 712$a$, 712$b$, and 712$c$ should thus each equal one-third. The customer-specific reservation set 706(2) includes two reservations, i.e., the reservations 711$d$ and 711$e$. The reservation-specific resource percentages 712$d$ and 712$e$ should thus each equal one-half. The customer-specific reservation set 706(3) includes four reservations, i.e., the reservations 711$f$, 711$g$, 711$h$, and 711$i$. The reservation-specific resource percentages 712$f$, 712$g$, 712$h$, and 712$i$ should thus each equal one-fourth. The customer-specific reservation sets 706(4) and 706(5) each include a single reservation, i.e., the reservations 711$j$ and 711$k$, respectively. Therefore, as described above, the reservation-specific resource percentages 712$j$ and 712$k$ should each equal one.

After the stationary distributions 710 are applied, effective distributions 714$a$-714$k$ are computed (collectively, effective distributions 714). As explained above, the reservation-specific resource percentages 712 are percentages of the customer-specific resource percentages 708 that should be allocated to the reservations 711. The effective distributions 714 are, in effect, a translation of the reservation-specific resource percentages 712 into percentages of the current set of consumable resources 702. The effective distributions 714$a$-714$k$ are computed relative to the reservations 711$a$-711$k$, respectively.

Specifically, each of the effective distributions 714 can be computed as a product of a corresponding reservation-specific resource percentage (from the reservation-specific resource percentages 712) and a corresponding customer-specific resource percentage (from the customer-specific resource percentages 708). For example, the effective distribution 714$a$ can be computed as a product of the reservation-specific resource percentage 712$a$ and the customer-specific resource percentage 708(1). Table I below lists exemplary values relative to the example of FIG. 7. It should be appreciated that the effective distributions 714 should sum to one.

TABLE 1

| EFFECTIVE DISTRIBUTION | VALUE |
|---|---|
| Effective distribution 714a | 0.0666666666666667 |
| Effective distribution 714b | 0.0666666666666667 |
| Effective distribution 714c | 0.0666666666666667 |
| Effective distribution 714d | 0.1 |
| Effective distribution 714e | 0.1 |
| Effective distribution 714f | 0.05 |
| Effective distribution 714g | 0.05 |
| Effective distribution 714h | 0.05 |
| Effective distribution 714i | 0.05 |
| Effective distribution 714j | 0.2 |
| Effective distribution 714k | 0.2 |

Once the effective distributions 714 have been calculated, in a typical embodiment, flow-control clocking weights 716$a$-716$k$ are calculated (collectively, flow-control clocking weights 716). The flow-control clocking weights 716 are, in effect, a translation of the effective distributions 714 into defined quantities of resources that should be allocated to each of the reservations 711. As explained in detail below, the flow-control clocking weights 716 can be calculated as products of the effective distributions 714 and a total number of resources in the current set of consumable resources 702 (i.e., N).

In particular, the flow-control clocking weight 716$a$ equals the effective distribution 714$a$ multiplied by N. The flow-control clocking weight 716$b$ equals the effective distribution 714$b$ multiplied by N. The flow-control clocking weight 716$c$ equals the effective distribution 714$c$ multiplied by N. The flow-control clocking weight 716$d$ equals the effective distribution 714$d$ multiplied by N. The flow-control clocking weight 716$e$ equals the effective distribution 714$e$ multiplied by N. The flow-control clocking weight 716$f$ equals the effective distribution 714$f$ multiplied by N. The flow-control clocking weight 716$g$ equals the effective distribution 714$g$ multiplied by N. The flow-control clocking weight 716$h$ equals the effective distribution 714$h$ multiplied by N. The flow-control clocking weight 716$i$ equals the effective distribution 714$i$ multiplied by N. The flow-control clocking weight 716$j$ equals the effective distribution 714$j$ multiplied by N. The flow-control clocking weight 716$k$ equals the effective distribution 714$k$ multiplied by N.

Each of the flow-control clocking weights 716 is representative of a defined number of resources from the current set of resources 702. As illustrated, a sum 718 of the flow-control clocking weights 716 equals the total number of consumable resources (i.e., N). Therefore, each of the flow-control clocking weights may be expressed in fractional units of resources. As described in greater detail with respect to FIGS. 13-14, the flow-clocking weights 716 enable the balanced-utilization partitioning scheme to be precisely executed on a per reservation basis.

Figure 8:
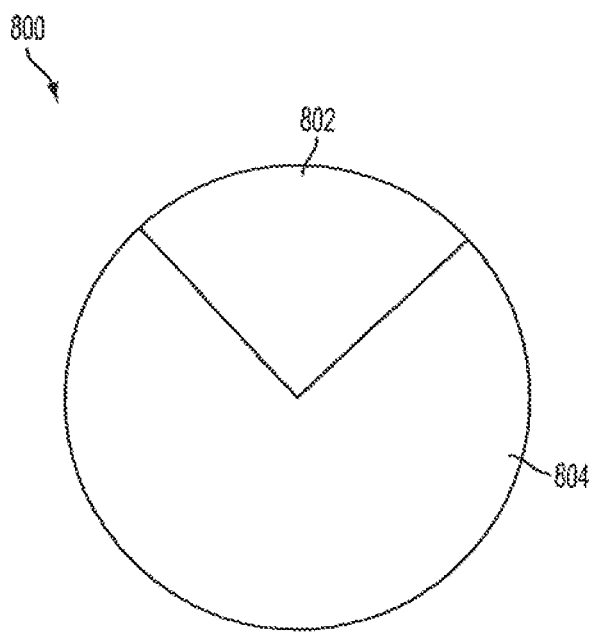
FIG. 8 illustrates an exemplary balanced-utilization partitioning scheme.

FIG. 8 illustrates an exemplary balanced-utilization partitioning scheme 800 that may be utilized by a flow-control instance. For example, the balanced-utilization partitioning scheme 800 may be implemented as the balanced-utilization partitioning scheme 314 of FIG. 3. The balanced-utilization partitioning scheme 800 includes two super partitions: a high-priority super partition 802 and a regular-priority super partition 804.

In a typical embodiment, the high-priority super partition 802 includes a subset of a current set of consumable resources that is allocated to eligible active customers. The eligible active customers may include, for example, customers who have elected to pay more for a higher quality of service. In various embodiments, the subset of the current set of consumable resources may be expressed as a percentage, an integer, or in other ways that will be apparent to one of ordinary skill in the art after reviewing the inventive principles described herein. The high-priority super partition 802 is then shared among the active eligible customers as described with respect to the balanced-utilization partitioning scheme 600 of FIG. 6.

In various embodiments, the regular-priority super partition 804 includes all consumable resources of the current set of consumable resources except those consumable resources allocated to the high-priority super partition 802. In various embodiments, the regular-priority super partition 804 is shared among active customers not eligible for the high-priority super partition 802 in the manner described with respect to FIG. 4. In various other embodiments, the regular-priority super partition 804 is shared among all active customers, including those eligible for the high-priority super partition 802, in the manner described with respect to FIG. 4.

As described with respect to the balanced-utilization partitioning scheme 314 of FIG. 3, the balanced-utilization partitioning scheme 800 dynamically changes during execution of the flow-control instance. Correspondingly, in a typical embodiment, a size of the high-priority super partition 802 and a size of the regular-priority super partition 804 can also dynamically change. For example, if fewer than all consumable resources allocated to the high-priority super partition 802 are in use, those unused consumable resources can be allocated to the regular-priority super partition 804 until there are active eligible customers for the high-priority super partition 802 requiring their use.

Figure 9:
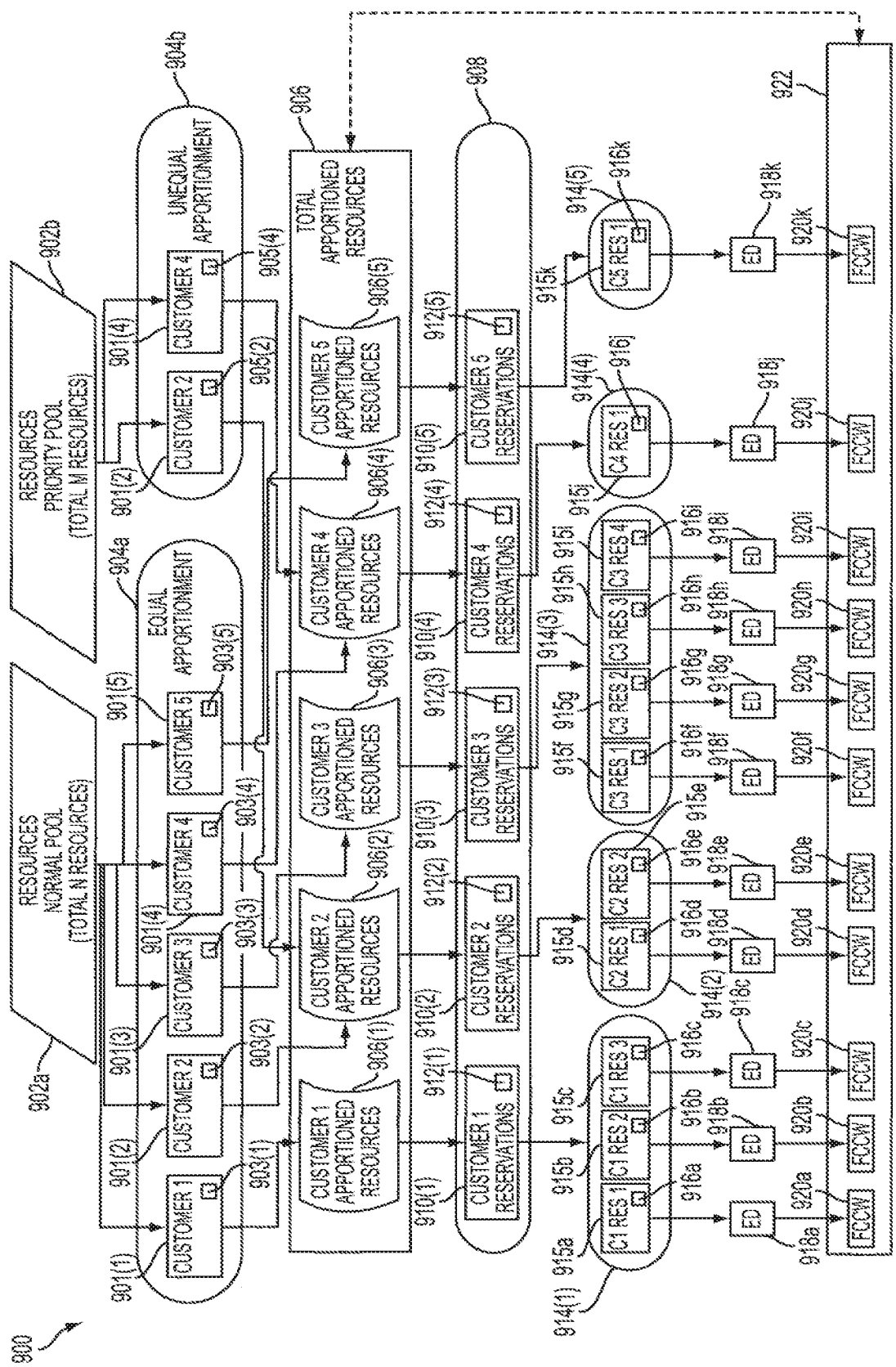
FIG. 9 illustrates an implementation of a balanced-utilization partitioning scheme.

FIG. 9 illustrates an implementation 900 of the balanced-utilization partitioning scheme 800 of FIG. 8. The implementation 900 includes a regular-priority super partition 902a and a high-priority super partition 902b. The regular-priority super partition 902 and the high-priority super partition 902b generally correspond to the regular-priority super partition 804 and the high-priority super partition 802, respectively, of FIG. 8. The regular-priority super partition 902a and the high-priority super partition 902b each comprise a defined number of consumable resources (at a given time).

In a typical embodiment, the implementation 900 performs an equal distribution 904a of the regular-priority super partition 902a across customers 901(1)-901(5). In a typical embodiment, the customers 901(1)-901(5) represent those customers having active reservations (collectively, customers 901). Therefore, the customers 901(1)-901(5) are apportioned defined quantities 903(1)-903(5), respectively, of resources from the regular-priority super partition 902a. In a typical embodiment, the defined quantities 903(1)-903(5), when summed, should equal a total number of resources contained within the regular-priority super partition 902a. According to the equal apportionment 904a, the defined quantities 903(1)-903(5) represent equal shares of the regular-priority super partition 902a.

In a typical embodiment, the implementation 900 performs an unequal distribution 904b of the high-priority super partition 904b across active customers who are eligible for a higher quality of service, i.e., the customers 901(2) and 901(4). In a typical embodiment, the customers 901(2) and 902(4) are each eligible for predetermined resource quantities 905(2) and 905(4), respectively, of the high-priority super partition 904b. According to the unequal apportionment 904b, the predetermined resource quantities 905(2) and 905(4) are not necessarily equal, although equality is possible.

As a result of the equal apportionment 904a and the unequal apportionment 904b, the customers 901(1)-901(5) have resource apportionments 906(1)-906(5), respectively. The resource apportionments 906(1)-906(5) are typically sums of quantities apportioned via the equal apportionment 904a and quantities apportioned via the unequal apportionment 904b. In particular, as shown, the customers 901(1), 901(3), and 901(5) are not eligible for the high-priority super partition 902b. Therefore, the resource apportionments 906(1), 906(3), and 906(5) equal the defined quantities 903(1), 903(3), and 903(5), respectively. Since the customer 901(2) is eligible for the high-priority super partition 902b, the resource apportionment 906(2) equals a sum of the defined quantity 903(2) and the predetermined resource quantity 905(2). In like manner, since the customer 901(4) is also eligible for the high-priority super partition 902b, the resource apportionment 906(5) equals a sum of the defined quantity 903(4) and the predetermined resource quantity 905(4).

Total apportioned resources 906 are an aggregation of the resource apportionments 906(1)-906(5). As described with respect to FIG. 8, as an optimization, resources of the high-priority super partition 902b that are not being utilized are allocated to the regular-priority super partition 902a. Therefore, in some embodiments, the total apportioned resources 906 will include a quantity of resources equal in number to a combined total number of resources in the regular-priority super partition 902a and the high-priority super partition 902b. In various other embodiments, it should appreciated that, by design, this may not be the case. For purposes of this example, the quantity of resources in the total apportioned resources 906 may be considered to be P.

Once the resource apportionments 906(1)-906(5) are computed, a number-to-percentage distribution 908 can be applied. As described above, the resource apportionments 906(1)-906(5) represent quantities of resources. The number-to-percentage distribution 908 operates to convert the resource apportionments 906(1)-906(5) to percentages that are distributed to the customer-specific reservation sets 910(1)-910(5) (collectively, customer-specific reservation sets 910), with each reservation set constituting an aggregation of customer reservations.

In particular, the customer-specific reservation sets 910(1)-910(5) are aggregations of active reservations for the customers 901(1)-901(5), respectively. The customer-specific reservation set 910(1) includes reservations 915a, 915b, and 915c. The customer-specific reservation set 910(2) includes reservations 915d and 915e. The customer-specific reservation set 910(3) includes reservations 915f, 915g, 915h, and 915i. The customer-specific reservation set 910(4) includes reservation 915j. Finally, the customer-specific reservation set 910(5) includes reservation 915k. For convenient reference, the reservations 915a-k may be referenced collectively as reservations 915.

The number-to-percentage distribution 908 functions to distribute customer-specific resource percentages 912(1), 912(2), 912(3), 912(4), and 912(5) to the customer-specific reservation sets 910(1), 910(2), 910(3), 910(4), and 910(5), respectively. For convenient reference, the customer-specific resource percentages 912(1)-912(5) may be referenced collectively as customer-specific resource percentages 912. For example, the customer-specific resource percentages 912(1)-912(5) can equal the resource apportionments 906(1)-906(5), respectively, divided by a total number of resources in the total apportioned resources 906. For example, if the resource apportionment 906(1) included five resources and the total apportioned resources 906 included one-hundred resources, the customer-specific resource percentage 912(1) would equal 0.05 in decimal form.

After the number-to-percentage distribution 908 is applied, stationary distributions 914(1), 914(2), 914(3), 914(4), and 914(5) are applied (collectively, stationary distributions 914). The stationary distributions 914 apportion the customer-specific resource percentages 912 to individual reservations of the customer-specific reservation sets 910. Specifically, the stationary distributions 914(1), 914(2), 914(3), 914(4), and 914(5) serve to distribute reservation-specific resource percentages 916a-916c, 916d-916e, 916f-916i, 916j, and 916k, respectively. In a typical embodiment, the stationary distributions 914 effect an equal apportionment of the customer-specific resource percentages 912 across each reservation set of the customer-specific reservation sets 910.

More particularly, the stationary distribution 914(1) apportions the customer-specific resource percentage 912(1) to the reservations 915a-915c (i.e., the customer-specific reservation set 910(1)). In this fashion, the reservation-specific resource percentages 916a, 916b, and 916c are distributed to the reservations 915a, 915b, and 915c, respectively. The reservation-specific resource percentages 916a-916c thereby represent proportions of the customer-specific resource percentage 912(1) that, according to the stationary distribution 914(1), collectively sum to one.

The stationary distribution 914(2) apportions the customer-specific resource percentage 912(2) to the reservations 915d-915e (i.e., the customer-specific reservation set 910(2)). In this fashion, the reservation-specific resource percentages 916d and 916e are distributed to the reservations 915d and 915e, respectively. The reservation-specific resource percentages 916d and 916e thereby represent proportions of the customer-specific resource percentage 912(2) that, according to the stationary distribution 914(2), collectively sum to one.

The stationary distribution 914(3) apportions the customer-specific resource percentage 912(3) to the reservations 915f-915i (i.e., the customer-specific reservation set 910(3)). In this fashion, the reservation-specific resource percentages 916f, 916g, 916h, and 916i are distributed to the reservations 915f, 915g, 915h, and 915i, respectively. The reservation-specific resource percentages 916f-916i thereby represent proportions of the customer-specific resource percentage 912(3) that, according to the stationary distribution 914(3), collectively sum to one.

The stationary distribution 914(4) apportions the customer-specific resource percentage 912(4) to the reservation 915j (i.e., the customer-specific reservation set 910(4)). In this fashion, the reservation-specific resource percentage 916j is distributed to the reservation 915j. The reservation-specific resource percentage 916j thereby represents a proportion of the customer-specific resource percentage 912(4). Since the customer-specific reservation set 910(4) includes only the reservation 915j, according to the stationary distribution 914(4), the reservation-specific resource percentage 916j will generally equal one.

The stationary distribution 914(5) apportions the customer-specific resource percentage 912(5) to the reservation 915k (i.e., the customer-specific reservation set 910(5)). In this fashion, the reservation-specific resource percentage 916k is distributed to the reservation 915k. The reservation-specific resource percentage 916k thereby represents a proportion of the customer-specific resource percentage 912(5). Since the customer-specific reservation set 910(5) includes only the reservation 915k, according to the stationary distribution 914(5), the reservation-specific resource percentage 916k will generally equal one.

In a typical embodiment, the stationary distributions 914 effect an equal distribution of the customer-specific resource percentages 912 across each reservation set of the customer-specific reservation sets 910. For example, the customer-specific reservation set 910(1) includes three reservations, i.e., the reservations 915a, 915b, and 915c. The reservation-specific resource percentages 916a, 916b, and 916c should thus each equal one-third. The customer-specific reservation set 910(2) includes two reservations, i.e., the reservations 915d and 915e. The reservation-specific resource percentages 916d and 916e should thus each equal one-half. The customer-specific reservation set 910(3) includes four reservations, i.e., the reservations 915f, 915g, 915h, and 915i. The reservation-specific resource percentages 916f, 916g, 916h, and 916i should thus each equal one-fourth. The customer-specific reservation sets 910(4) and 910(5) each include a single reservation, i.e., the reservations 915j and 915k, respectively. Therefore, as described above, the reservation-specific resource percentages 916j and 916k should each equal one.

After the stationary distributions 914 are applied, effective distributions 918a-918k are computed (collectively, effective distributions 918). As explained above, the reservation-specific resource percentages 916 are percentages of the customer-specific resource percentages 912 that should be allocated to the reservations 915. The effective distributions 918 are, in effect, a translation of the reservation-specific resource percentages 916 into percentages of the total apportioned resources 906. The effective distributions 918a-918k are computed relative to the reservations 915a-915k, respectively.

Specifically, each of the effective distributions 918 can be computed as a product of a corresponding reservation-specific resource percentage (from the reservation-specific resource percentages 916) and a corresponding customer-specific resource percentage (from the customer-specific resource percentages 912). For example, the effective distribution 918a can be computed as a product of the reservation-specific resource percentage 916a and the customer-specific resource percentage 912(1).

Once the effective distributions 918 have been calculated, in a typical embodiment, flow-control clocking weights 920a-920k are calculated (collectively, flow-control clocking weights 920). The flow-control clocking weights 920 are, in effect, a translation of the effective distributions 918 into defined quantities of resources that should be allocated to each of the reservations 915. As explained in detail below, the flow-control clocking weights 920 can be calculated as products of the effective distributions 918 and a total number of apportioned resources in the total apportioned resources 906 (i.e., P).

In particular, the flow-control clocking weight 920a equals the effective distribution 918a multiplied by P. The flow-control clocking weight 920b equals the effective distribution 918b multiplied by P. The flow-control clocking weight 920c equals the effective distribution 918c multiplied by P. The flow-control clocking weight 920d equals the effective distribution 918d multiplied by P. The flow-control clocking weight 920e equals the effective distribution 918e multiplied by P. The flow-control clocking weight 920f equals the effective distribution 918f multiplied by P. The flow-control clocking weight 920g equals the effective distribution 918g multiplied by P. The flow-control clocking weight 920*h* equals the effective distribution 918*h* multiplied by P. The flow-control clocking weight 920*i* equals the effective distribution 918*i* multiplied by P. The flow-control clocking weight 920*j* equals the effective distribution 918*j* multiplied by P. The flow-control clocking weight 920*k* equals the effective distribution 918*k* multiplied by P.

Each of the flow-control clocking weights 920 is representative of a defined number of resources from the total apportioned resources 906. As illustrated, a sum 922 of the flow-control clocking weights 920 equals the total number of apportioned resources (i.e., P). Therefore, each of the flow-control clocking weights may be expressed in fractional units of resources. As described in greater detail with respect to FIGS. 13-14, the flow-clocking weights 920 enable the balanced-utilization partitioning scheme to be precisely executed on a per reservation basis.

Figure 10:
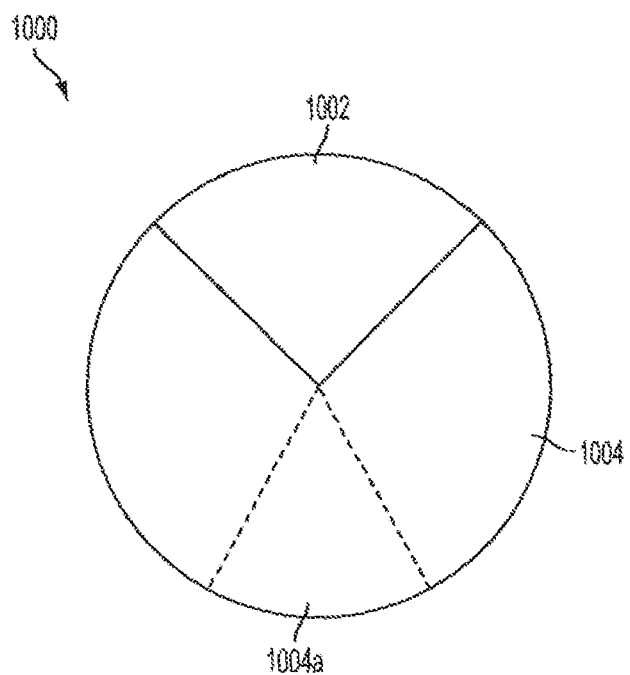
FIG. 10 illustrates a balanced-utilization partitioning scheme.

FIG. 10 illustrates a balanced-utilization partitioning scheme 1000 that may be utilized by a flow-control instance such as, for example, the flow-control instance 300 of FIG. 3. For example, the balanced-utilization partitioning scheme 1000 may be implemented as the balanced-utilization partitioning scheme 314 of FIG. 3. The balanced-utilization partitioning scheme 1000 includes a high-priority super partition 1002 and a regular-priority super partition 1004. The high-priority super partition 1002 operates as described with respect to the high-priority super partition 802 of FIG. 8 and the high-priority super partition 902*b* of FIG. 9. The regular-priority super partition 1004 operates as described with respect to the regular-priority super partition 804 of FIG. 8 and the regular-priority super partition 902*a* of FIG. 9. However, differently from FIGS. 8-9, the balanced-utilization scheme 1000 additionally includes a low-priority super partition 1004*a* that is a subset of the regular-priority super partition 1004.

The low-priority super partition 1004*a* is a partition of dynamically variable size and includes consumable resources of the regular-priority super partition 1004 that are not in use at a given time. In a typical embodiment, the low-priority super partition 1004*a* allows a designated class of customers to pay a much lower price for service in exchange for a much lower quality of service. In addition, the low-priority super partition 1004*a* helps to maximize overall utilization of the current set of consumable resources. Typically, the low-priority super partition 1004*a* is active only when the regular-priority super partition 1004 is not being fully utilized by eligible active customers. Whenever there are sufficient eligible active customers to fully utilize the regular-priority super partition 1004, the low-priority super partition 1004*a* is typically inactive.

In various embodiments, reservations can be associated with priority levels selected from a plurality of priority levels (e.g., priority levels one to nine). In a typical embodiment, the plurality of priority levels vary from low priority (e.g., level one) to high priority (e.g., level nine). As described in more detail below, a priority level associated with a given reservation can be used to configurably vary a computation of effective distributions.

Figure 11:
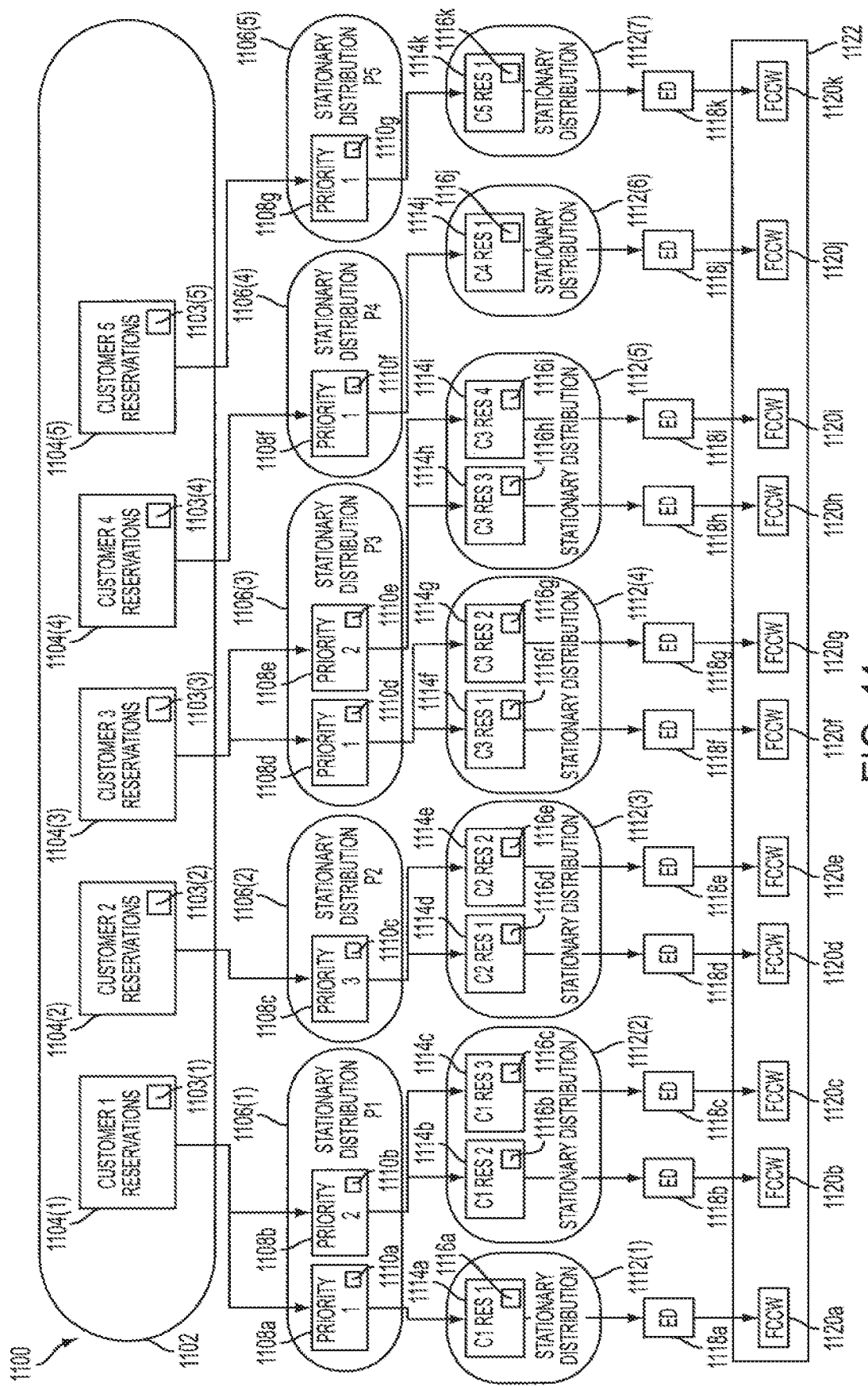
FIG. 11 illustrates an implementation of a balanced-utilization partitioning scheme.

FIG. 11 illustrates an implementation 1100 of a balanced-utilization partitioning scheme that utilizes priorities. The implementation 1100 begins by apportioning a set of consumable resources among customer-specific reservation sets 1104(1), 1104(2), 1104(3), 1104(4), and 1104(5) (collectively, customer-specific reservation sets 1104). As shown, the set of consumable resources is apportioned to the customer-specific reservation sets 1104 according to a distribution 1102.

Each of the customer-specific reservation sets 1104 is an aggregation of active reservations for a particular customer (for each of five customers as shown). In particular, the customer-specific reservation set 1104(1) includes reservations 1114*a*, 1114*b*, and 1114*c*. The customer-specific reservation set 1104(2) includes reservations 1114*d* and 1114*e*. The customer-specific reservation set 1104(3) includes reservations 1114*f*, 1114*g*. 1114*h*, and 1114*i*. The customer-specific reservation set 1104(4) includes reservation 1114*j*. Finally, the customer-specific reservation set 1104(5) includes reservation 1114*k*. For convenient reference, the reservations 1114*a*-1114*k* may be referenced collectively as reservations 1114. The reservations 114 each have a priority level associated therewith. In a typical embodiment, the priority level may be selected from a plurality of priority levels of increasing priority (e.g., one to nine).

In various embodiments, the distribution 1102 may be applied as described, for example, with respect to the number-to-percentage distribution 908 of FIG. 9 or the stationary distribution 704 of FIG. 7. In that way, the distribution 1102 may apply a balanced partition scheme as described with respect to FIG. 7 or apply a high-priority super partition and a regular-priority super partition as described with respect to FIG. 9. Thus, the distribution 1102 distributes customer-specific resource percentages 1103(1)-1103(5) to the customer-specific reservation sets 1104(1)-1104(5), respectively. For convenient reference, the customer-specific resource percentages 1103(1)-1103(5) may be referenced collectively as resource percentages 1103.

In a typical embodiment, after the distribution 1102 has been applied, stationary distributions 1106(1)-1106(5) are applied (collectively, stationary distributions 1106). The stationary distributions 1106 apportion the customer-specific resource percentages 1103 to priority groupings 1108*a*-1108*g* of the customer-specific reservation sets 1104. In a typical embodiment, a priority grouping exists for each priority level at which there is an active reservation for a given customer. In particular, the stationary distributions 1106(1), 1106(2), 1106(3), 1106(4), and 1106(5) serve to distribute priority-specific resource percentages 1110*a*-1110*b*, 1110*c*, 1110*d*-1110*e*, 1110*f*, and 1110*g* respectively. In a typical embodiment, priority groupings of the priority groupings 1108 that represent higher priority levels are awarded greater proportions of the customer-specific resource percentages 1103 than those priority groupings representing lower priority levels. An example of how the priority-specific resource percentages can be computed will be described with respect to FIG. 12.

The stationary distribution 1106(1) apportions the customer-specific resource percentage 1103(1) to the priority groupings 1108*a* and 1108*b*. The priority groupings 1108*a* and 1108*b* indicate that the customer-specific reservation set 1104(1) includes one or more reservations at priority-level one and priority-level two, respectively (i.e. two priority groupings). The priority-specific resource percentages 1110*a* and 1110*b* thereby represent proportions of the customer-specific resource percentage 1103(1) that are apportioned to the priority groupings 1108*a* and 1108*b*, respectively. According to the stationary distribution 1106(1), the priority-specific resource percentages 1110*a* and 1110*b* collectively sum to one.

The stationary distribution 1106(2) apportions the customer-specific resource percentage 1103(2) to the priority grouping 1108*c*. The priority grouping 1108*c* indicates that the customer-specific reservation set 1104(2) includes one or more reservations at priority-level three (i.e., one priority grouping). The priority-specific resource percentage 1110*c* thereby represents a proportion of the customer-specific resource percentage 1103(2) that is apportioned to the priority grouping 1108c. Since the customer-specific reservation set 1104(2) only includes one priority grouping, i.e., the priority grouping 1108c, according to the stationary distribution 1106(2), the priority-specific resource percentage 1110c should equal one.

The stationary distribution 1106(3) apportions the customer-specific resource percentage 1103(3) to the priority groupings 1108d and 1108e. The priority groupings 1108d and 1108e indicate that the customer-specific reservation set 1104(3) includes one or more reservations at priority-level one and priority-level two, respectively (i.e. two priority groupings). The priority-specific resource percentages 1110d and 1110e thereby represent proportions of the customer-specific resource percentage 1103(3) that are apportioned to the priority groupings 1108d and 1108e, respectively. According to the stationary distribution 1106(3), the priority-specific resource percentages 1110d and 1110e collectively sum to one.

The stationary distribution 1106(4) apportions the customer-specific resource percentage 1103(4) to the priority grouping 1108f. The priority grouping 1108f indicates that the customer-specific reservation set 1104(4) includes one or more reservations at priority-level one (i.e., one priority grouping). The priority-specific resource percentage 1110f thereby represents a proportion of the customer-specific resource percentage 1103(4) that is apportioned to the priority grouping 1108f. Since the customer-specific reservation set 1104(4) only includes one priority grouping, i.e., the priority grouping 1108f, according to the stationary distribution 1106(4), the priority-specific resource percentage 1110f should equal one.

The stationary distribution 1106(5) apportions the customer-specific resource percentage 1103(5) to the priority grouping 1108g. The priority grouping 1108g indicates that the customer-specific reservation set 1104(5) includes one or more reservations at priority-level one (i.e., one priority grouping). The priority-specific resource percentage 1110g thereby represents a proportion of the customer-specific resource percentage 1103(5) that is apportioned to the priority grouping 1108g. Since the customer-specific reservation set 1104(5) only includes one priority grouping, i.e., the priority grouping 1108g, according to the stationary distribution 1106(5), the priority-specific resource percentage 1110g should equal one.

After the stationary distributions 1106 are applied, stationary distributions 1112(1), 1112(2), 1112(3), 1112(4), 1112(5), 1112(6), and 1112(7) are applied (collectively, stationary distributions 1112). The stationary distributions 1112 apportion the priority-specific resource percentages 1110 to individual reservations of the priority groupings 1108. Specifically, the stationary distributions 1112(1), 1112(2), 1112(3), 1112(4), 1112(5), 1112(6), and 1112(7) serve to distribute reservation-specific resource percentages 1116a, 1116b-1116c, 1116d-1116e, 1116f-1116g, 1116h-1116i, 1116j, and 1116k respectively. In a typical embodiment, the stationary distributions 1112 effect an equal distribution of the priority-specific resource percentages 1110 across each priority grouping of the priority groupings 1108.

More particularly, the stationary distribution 1112(1) apportions the priority-specific resource percentage 1110a to the reservation 1114a (i.e., the priority grouping 1108a). In this fashion, the reservation-specific resource percentage 1116a is distributed to the reservation 1114a. The reservation-specific resource percentage 1116a thereby represents a proportion of the priority-specific resource percentage 1110a. Since the priority grouping 1108a only includes one reservation (i.e., the reservation 1114a), according to the stationary distribution 1112(1), the reservation-specific resource percentage 1116a should equal one.

The stationary distribution 1112(2) apportions the priority-specific resource percentage 1110b to the reservations 1114b-114c (i.e., the priority grouping 1108b). In this fashion, the reservation-specific resource percentages 1116b and 1116c are distributed to the reservations 1114b and 1114c, respectively. The reservation-specific resource percentages 1116b and 1116c thereby represent proportions of the priority-specific resource percentage 1110b that, according to the stationary distribution 1112(2), collectively sum to one.

The stationary distribution 1112(3) apportions the priority-specific resource percentage 1110c to the reservations 1114d-114e (i.e., the priority grouping 1108c). In this fashion, the reservation-specific resource percentages 1116d and 1116d are distributed to the reservations 1114d and 1114e, respectively. The reservation-specific resource percentages 1116d and 1116e thereby represent proportions of the priority-specific resource percentage 1110c that, according to the stationary distribution 1112(3), collectively sum to one.

The stationary distribution 1112(4) apportions the priority-specific resource percentage 1110d to the reservations 1114f-1114g (i.e., the priority grouping 1108d). In this fashion, the reservation-specific resource percentages 1116f and 1116g are distributed to the reservations 1114f and 1114g, respectively. The reservation-specific resource percentages 1116f and 1116g thereby represent proportions of the priority-specific resource percentage 1110d that, according to the stationary distribution 1112(4), collectively sum to one.

The stationary distribution 1112(5) apportions the priority-specific resource percentage 1110e to the reservations 1114h-1114i (i.e., the priority grouping 1108e). In this fashion, the reservation-specific resource percentages 1116h and 1116i are distributed to the reservations 1114h and 1114i, respectively. The reservation-specific resource percentages 1116h and 1116i thereby represent proportions of the priority-specific resource percentage 1110e that, according to the stationary distribution 1112(5), collectively sum to one.

The stationary distribution 1112(6) apportions the priority-specific resource percentage 1110f to the reservation 1114j (i.e., the priority grouping 1108f). In this fashion, the reservation-specific resource percentage 1116j is distributed to the reservation 1114j. The reservation-specific resource percentage 1116j thereby represents a proportion of the priority-specific resource percentage 1110f. Since the priority grouping 1108f only includes one reservation (i.e., the reservation 1114j), according to the stationary distribution 1112(6), the reservation-specific resource percentage 1116j should equal one.

The stationary distribution 1112(7) apportions the priority-specific resource percentage 1110g to the reservation 1114k (i.e., the priority grouping 1108g). In this fashion, the reservation-specific resource percentage 1116k is distributed to the reservation 1114k. The reservation-specific resource percentage 1116k thereby represents a proportion of the priority-specific resource percentage 1110g. Since the priority grouping 1108g only includes one reservation (i.e., the reservation 1114k), according to the stationary distribution 1112(7), the reservation-specific resource percentage 1116k should equal one.

In a typical embodiment, the stationary distributions 1112 effect an equal distribution of the priority-specific resource percentages 1110 across each priority grouping of the priority groupings 1108. For example, the priority groupings 1108a, 110f, and 1110g each include one reservation. Therefore, the reservation-specific resource percentages 1116a, 1116j, and 1116j should each equal one. By way of further example, the priority groupings 1108b, 1108c, 1108d, and 1108e each include two reservations. Therefore, the reservation-specific resource percentages 1116b-1116i should each equal one-half.

After the stationary distributions 1112 are applied, effective distributions 1118a-1118k are computed (collectively, effective distributions 1118). As explained above, the reservation-specific resource percentages 1116 are percentages of the priority-specific resource percentages 1110 that should be allocated to the reservations 1114. The effective distributions 1118 are, in effect, a translation of the reservation-specific resource percentages 1116 into percentages of the current set of consumable resources. The effective distributions 1118a-1118k are computed relative to the reservations 1114a-1114k, respectively.

The distribution 1102 may be considered an outer stationary distribution since it is across customers and thus "outside" any one customer. The stationary distributions 1106 and the stationary distributions 1108 may be considered inner stationary distributions as since they are computed with respect to particular customers and are thus "inside" particular customers. Each of the effective distributions 1118 represents a proportion of the current set of consumable resources that is being apportioned to a given reservation of the reservations 1114. Each of the effective distributions 1118 can be computed as a product of the outer stationary distribution and each inner stationary distribution.

Stated differently, each of the effective distributions 1118 can be computed as a product of a corresponding reservation-specific resource percentage (from the reservation-specific resource percentages 1116), a corresponding priority-specific resource percentage (from the priority-specific resource percentages 1110), and a corresponding customer-specific resource percentage (from the customer-specific resource percentages 1103). For example, the effective distribution 1118a can be computed as a product of the reservation-specific resource percentage 1116a, the priority-specific resource percentage 1110a, and the customer-specific resource percentage 1103(1). It should be appreciated that the effective distributions 1118 should sum to one.

Once the effective distributions 1118 have been calculated, in a typical embodiment, flow-control clocking weights 1120a-1120k are calculated (collectively, flow-control clocking weights 1120). The flow-control clocking weights 1120 are, in effect, a translation of the effective distributions 1118 into defined quantities of resources that should be allocated to each of the reservations 1114. As explained in detail below, the flow-control clocking weights 1120 can be calculated as products of the effective distributions 1118 and a total number of resources in the current set of consumable resources (i.e., N).

In particular, the flow-control clocking weight 1120a equals the effective distribution 1118a multiplied by N. The flow-control clocking weight 1120b equals the effective distribution 1118b multiplied by N. The flow-control clocking weight 1120c equals the effective distribution 1118c multiplied by N. The flow-control clocking weight 1120d equals the effective distribution 1118d multiplied by N. The flow-control clocking weight 1120e equals the effective distribution 1118e multiplied by N. The flow-control clocking weight 1120f equals the effective distribution 1118f multiplied by N. The flow-control clocking weight 1120g equals the effective distribution 1118g multiplied by N. The flow-control clocking weight 1120h equals the effective distribution 1118h multiplied by N. The flow-control clocking weight 1120i equals the effective distribution 1118i multiplied by N. The flow-control clocking weight 1120j equals the effective distribution 1118j multiplied by N. The flow-control clocking weight 1120k equals the effective distribution 1118k multiplied by N.

Each of the flow-control clocking weights 1120 is representative of a defined number of resources from the current set of consumable resources. As illustrated, a sum 1122 of the flow-control clocking weights 1120 equals the total number of consumable resources (i.e., N). Therefore, each of the flow-control clocking weights may be expressed in fractional units of resources. As described in greater detail with respect to FIGS. 13-14, the flow-clocking weights 1120 enable the balanced-utilization partitioning scheme to be precisely executed on a per reservation basis.

After reviewing the inventive principles contained herein, one of ordinary skill in the art will appreciate that outer stationary distributions and inner stationary distributions may be established differently than is described with respect to FIG. 11. For example, any number of inner stationary distributions may be established to further sub-divide a given percentage of consumable resources. In each case, effective distributions may be computed as products of an outer stationary distribution and each inner stationary distribution.

Figure 12:
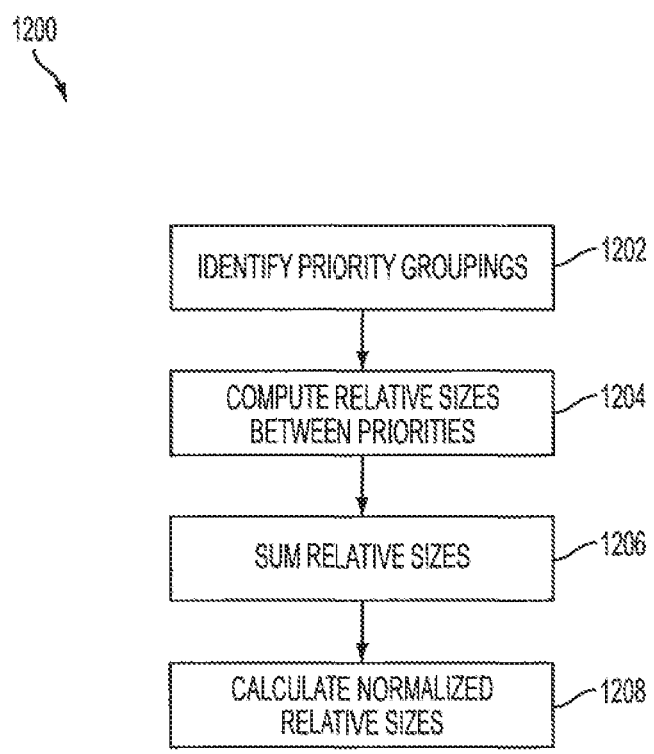
FIG. 12 illustrates a process for calculating an inner stationary distribution.

FIG. 12 illustrates a process 1200 for calculating an inner stationary distribution for a customer based on priorities. In a typical embodiment, the process 1200 is performed for each active customer as described, for example, with respect to FIG. 11. The process 1200 can be performed by a computer cluster such as, for example, the computer cluster 100 of FIG. 1. The process 1200 begins at step 1202. At step 1202, the customer's priority groupings are identified. In a typical embodiment, a priority grouping is identified for each priority level of a plurality of priority levels at which the customer has an active reservation. The plurality of priority levels may be enumerated from 1 to n. From step 1202, the process 1200 proceeds to step 1204.

At step 1204, a relative size between priorities is computed for each priority grouping. The relative size represents a proportion of a given set of resources that should be apportioned a given priority level. For example, in one embodiment, the relative size can be calculated using an exponential function such as, for example, the function below, where p represents a priority level of the priority grouping and F(p) represents the relative size:

$$F(p)=1.25^{p-1}$$

From step 1204, the process 1200 proceeds to step 1206.

At step 1206, a sum of all relative sizes is calculated. From step 1206, the process 1200 proceeds to step 1208. At step 1208, for each priority grouping, a normalized relative size is calculated based on which priority groupings exist. For example, for each priority grouping, the normalized relative size can equal the relative size divided by the sum of all relative sizes. It should appreciated that a sum of all normalized relative sizes for the customer should equal one (i.e., a stationary distribution). After step 1208, the process 1200 ends.

Figure 13:
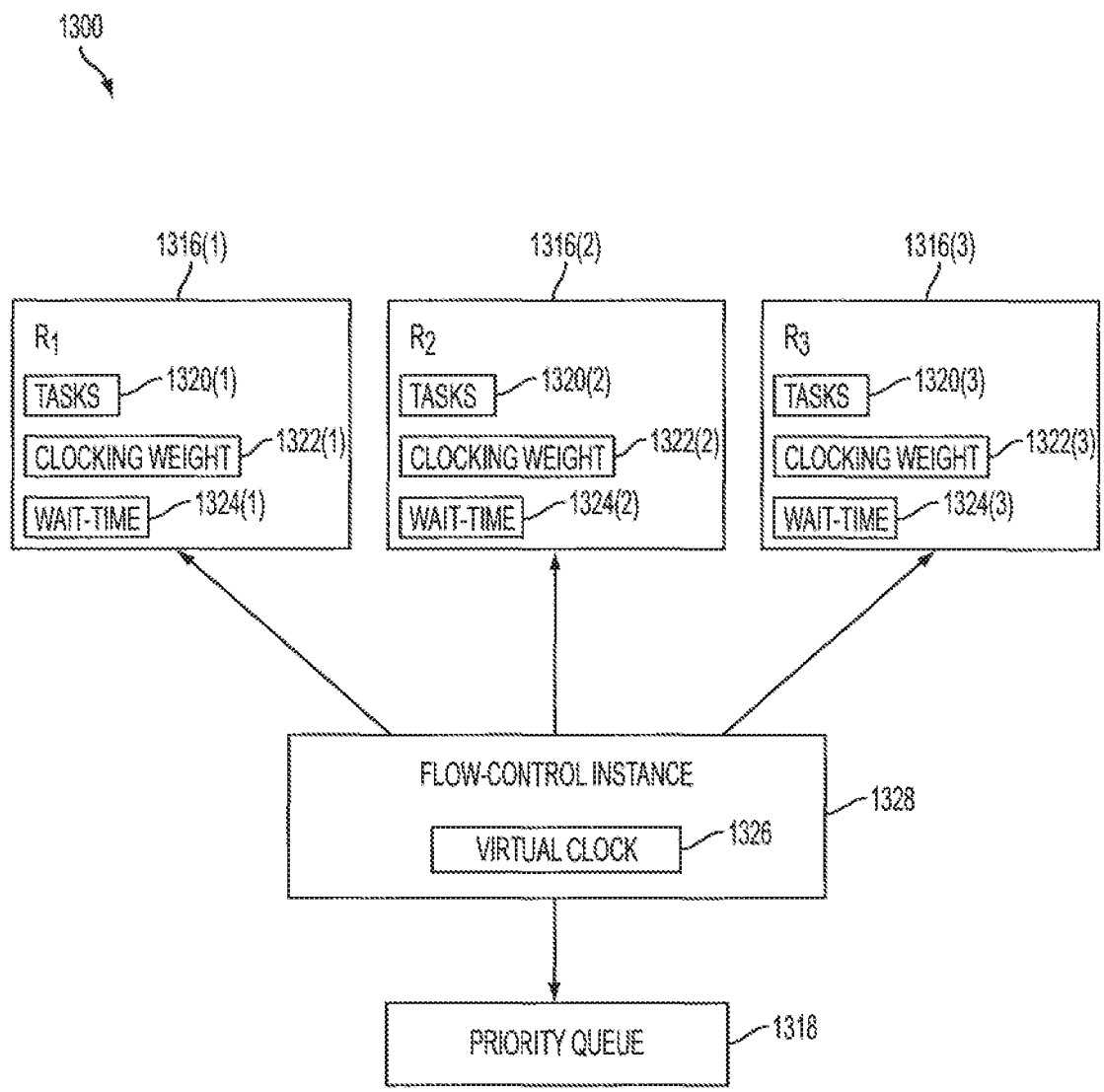
FIG. 13 illustrates clocking functionality of a flow-control instance.

FIG. 13 illustrates clocking functionality 1300 of a flow-control instance 1328. The clocking functionality 1300 may be performed, for example, as part of step 406 of the process 400 of FIG. 4. In a typical embodiment, the flow-control instance 1328 operates as described with respect to the flow-control instance 300 of FIG. 3. More particularly, however, the flow-control instance 1328 maintains reservations 1316(1), 1316(2), and 1316(3). The reservations 1316(1), 1316(2), and 1316(3) include tasks 1320(1), 1320(2), and 1320(3), respectively, flow-control clocking weights 1322(1), 1322(2), and 1322(3), respectively, and wait-times 1324(1), 1324(2), and 1324(3), respectively.

For convenient reference, the reservations 1316(1), 1316(2), and 1316(3), the flow-control clocking weights 1322(1), 1322(2), and 1322(3), and the wait-times 1324(1), 1324(2), and 1324(3) may be referenced collectively as a current set of active reservations 1316, clocking weights 1322, and wait-times 1324, respectively. For illustrative purposes, the current set of active reservations 1316 is shown to include the reservations 1316(1), 1316(2), and 1316(3), which reservations may be considered to represent an exemplary snapshot-in-time of the current set of active reservations 1316. As described in more detail below, the flow-control instance 1328 maintains a priority queue 1318 of the current set of active reservations 1316.

The tasks 1320(1), 1320(2), and 1320(3) are each a derived grouping of one or more tasks having, for example, a same task key as described above. In a typical embodiment, the clocking weights 1322 enable precise execution of a balanced-utilization partitioning scheme such as, for example, the balanced-utilization partitioning schemes described with respect to FIGS. 6-12. The flow-control clocking weights 1322(1), 1322(2), and 1322(3) define a proportion of a current set of consumable resources that should be allocated to the reservations 1316(1), 1316(2), and 1316(3), respectively. As described with respect to FIG. 14, each of the flow-control clocking weights 1316 is computed as a product of an effective distribution and a number of resources in the current set of consumable resources. Therefore, the clocking weights 1322(1), 1322(2), and 1322(3) may be expressed in fractional units of resources. It should be appreciated that the clocking weights 1322(1), 1322(2), and 1322(3) change dynamically responsive to changes in, for example, the current set of active reservations 1316.

The wait-times 1324 are an up-to-date measure of how needy the reservations 1316 are for the class of consumable resources and are updated by the flow-control instance 1328. The wait-times 1324 may be expressed in fractional units of resource-time (e.g., resource-seconds when wall-time is used). The flow-control instance 1328 maintains a virtual clock 1326 that, every clocking cycle, initiates a virtual pendulum for each reservation in the current set of active reservations 1316. In various embodiments, a clocking cycle can be, for example, a configurable unit of wall time (e.g., seconds or milliseconds) or a configurable number of CPU cycles. Other alternatives that can be considered a clocking cycle will be apparent to one of ordinary skill in the art after reviewing the inventive principles described herein.

Figure 14:
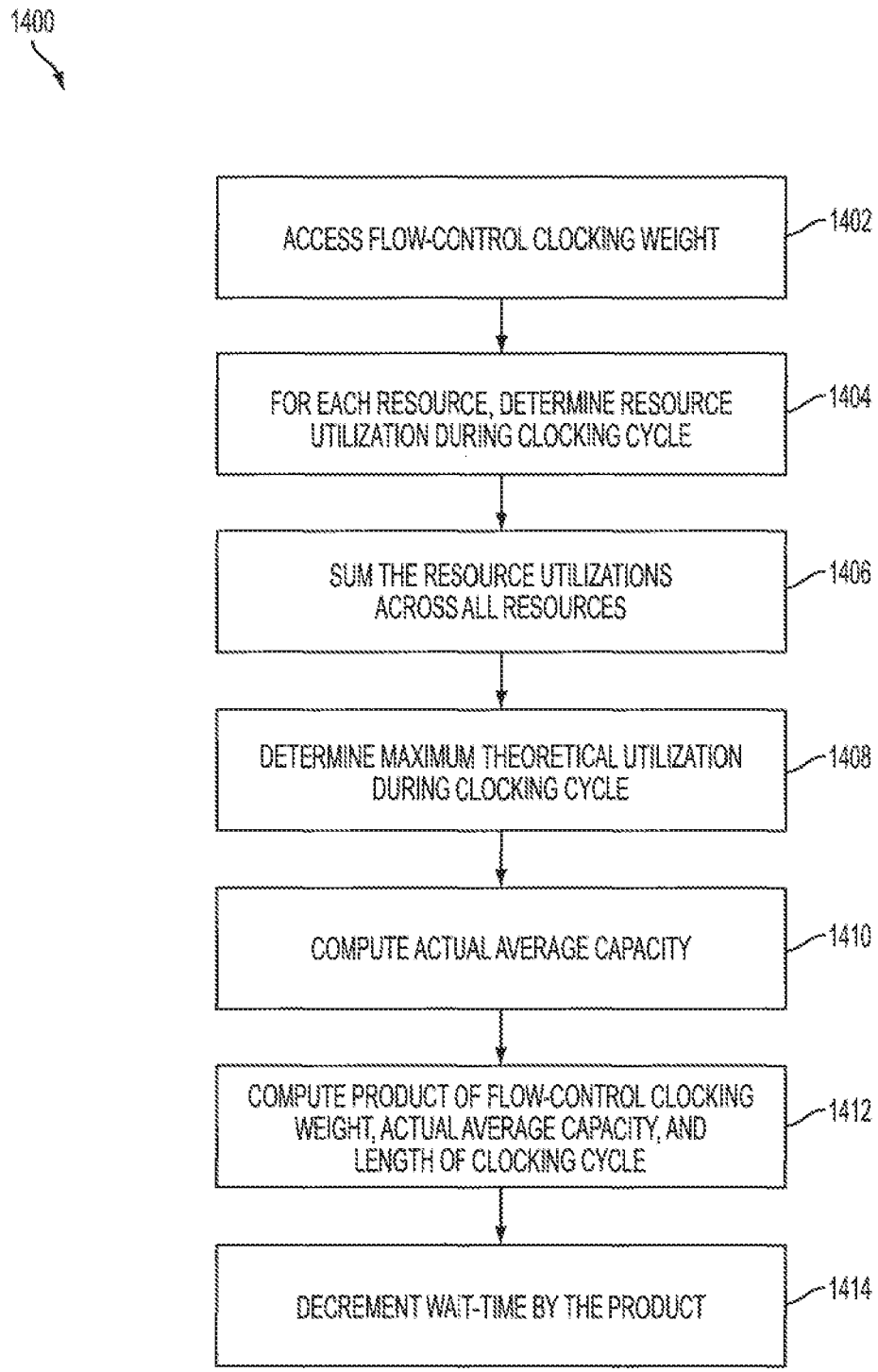
FIG. 14 illustrates a process for decrementing a wait-time.
Figure 15:
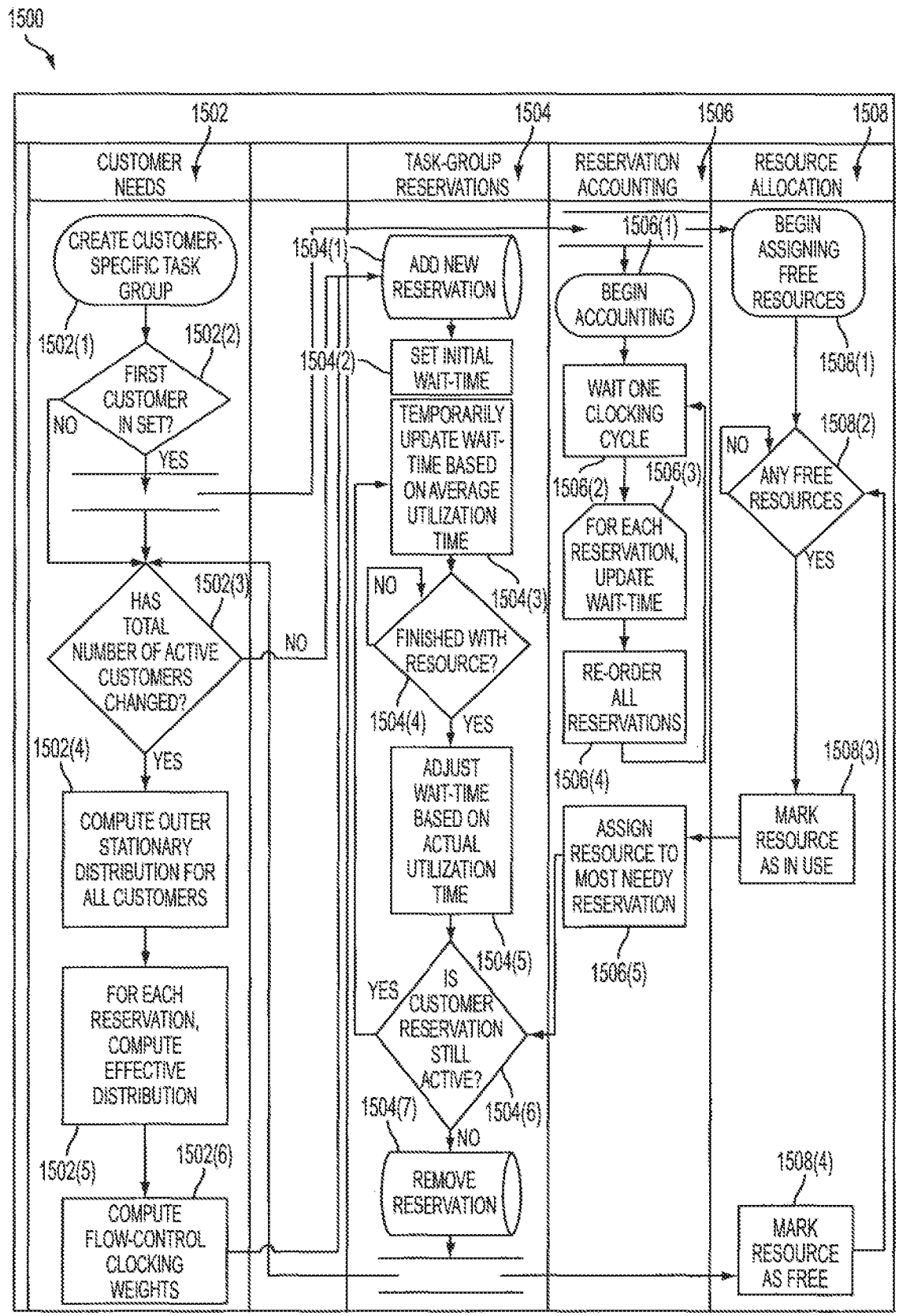
FIG. 15 illustrates a collection of interactive processes that may be executed by a flow-control instance.
Figure 16:
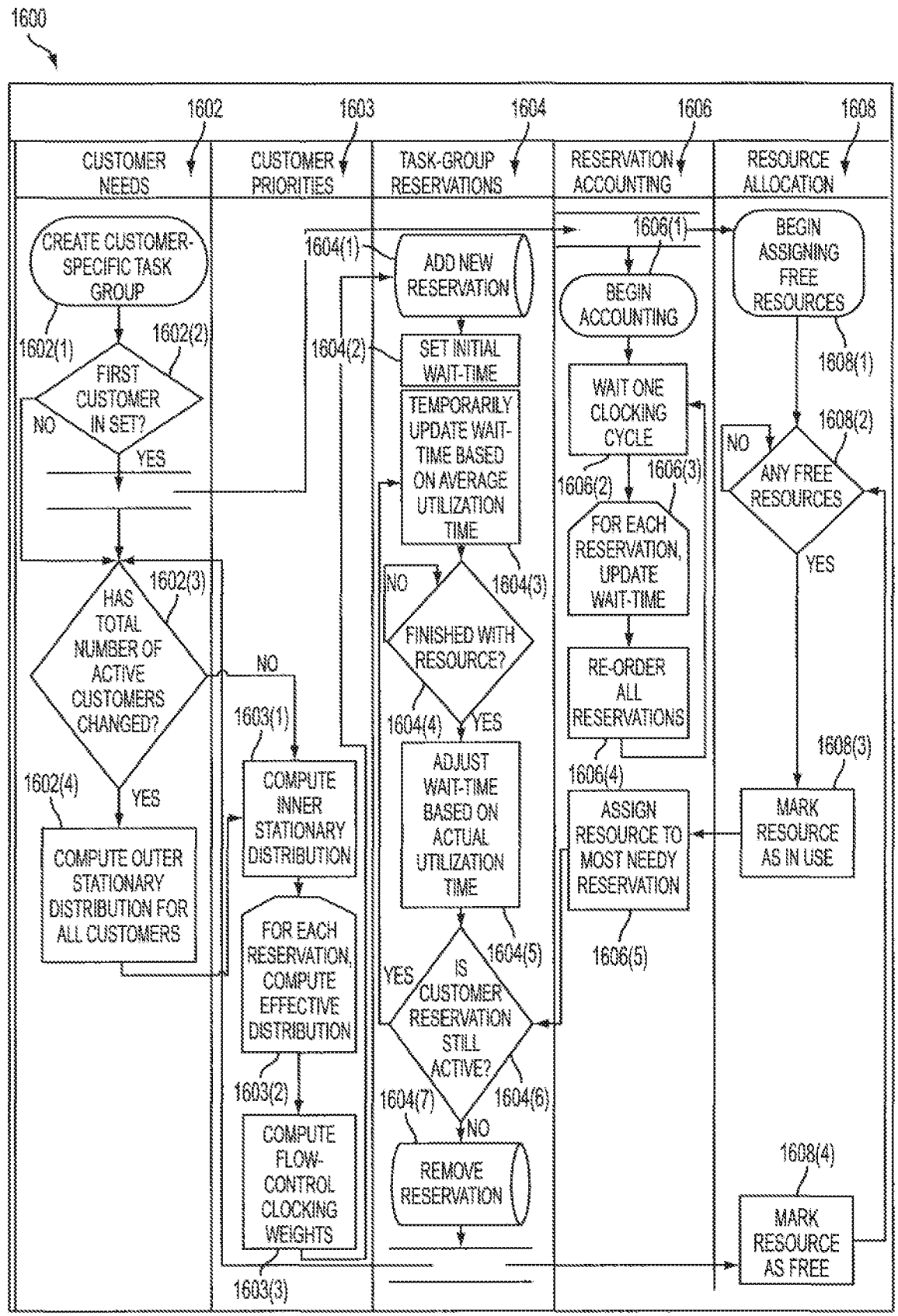
FIG. 16 illustrates a collection of interactive processes that may be executed by a flow-control instance.

As described in greater detail with respect to FIGS. 15-16, the wait-times 1324(1), 1324(2), and 1324(3) are each given initial values upon creation of the reservations 1316(1), 1316(2), and 1316(3), respectively. The initiation of the virtual pendulums results in the reservations 1316 being "clocked" each clocking cycle according to the clocking weights 1322. It should be noted that each reservation in the current set of active reservations 1316, by virtue of its inclusion, includes at least one task that has not been processed to completion. Therefore, in various embodiments in which lower wait-times represent greater neediness, the wait-times 1324 are decremented each clocking cycle by a factor of a corresponding clocking weight of the clocking weights 1322 (i.e., clocked to move the virtual pendulum in a negative direction). An example of how the wait-times 1324 can be decremented will be described with respect to FIG. 14.

When a task of a given reservation in the current set of reservations 1316 is finished accessing a given consumable resource, a corresponding wait-time of the wait-times 1324 is incremented by a factor of a corresponding clocking weight of the clocking weights 1322 (i.e., clocked to move the virtual pendulum in a positive direction). For example, the corresponding wait-time can be incremented by a product of the corresponding clocking weight and a number of clocking units that the task has accessed the given consumable resource. In particular, in embodiments in which wall time is used to define the clocking cycle, the number of clocking units may be expressed in seconds with precision, for example, to a nearest millisecond. Therefore, if the task has accessed the given consumable resource for 12.001 seconds, the corresponding wait-time would be incremented by a product of 12.001 seconds and the corresponding clocking weight (i.e., units of resource-seconds).

The flow-control instance 1328 maintains the priority queue 1318 based on the current set of active reservations 1316. In a typical embodiment, the priority queue 1318 is sorted by the wait-times 1324, where a lowest wait-time indicates a most-needy reservation and a highest wait-time indicates a least-needy reservation. Each clocking cycle, as the virtual pendulums are clocked negatively or positively in the manner described above, the flow-control instance 1328 re-sorts the priority queue 1318 based on updated values for the wait-times 1324. As described in greater detail below with respect to the ensuing Figures, the flow-control instance 1328 assigns consumable resources of the current set of consumable resources to reservations of the current set of active reservations 1316 based on relative neediness. In a typical embodiment, the clocking weights 1322 and the wait-times 1324 may be maintained in a double-precision floating-point format according to the IEEE 754 standard.

FIG. 14 illustrates a process 1400 for decrementing a wait-time for each reservation of a set of active reservations. For example, the process 1400 may be performed as part of performing clocking as described with respect to FIG. 13. The process 1400 may be performed by a computer cluster such as, for example, the computer cluster 100 of FIG. 1. The process 1400 is typically performed each clocking cycle. The process 1400 begins at step 1402.

At step 1402, a flow-control clocking weight is accessed. In a typical embodiment, the flow-control clocking weight is computed as part of generating a balanced-utilization partitioning scheme as described with respect to FIGS. 7, 9, and 11. As described above, the flow-control clocking weight equals the reservation's effective distribution multiplied by a total number of resources in a current set of consumable resources. In that way, the flow-control clocking weight represents a number of resources and can be expressed in fractional units of resources. From step 1402, the process 1400 proceeds to step 1404. At step 1404, for each resource, resource utilization during the clocking cycle is determined. For example, the computer cluster tracks how many clocking units that each resource has been utilized. The resource utilization can be expressed in fractional units of resource-time. For example, in embodiments in which wall time is utilized, the resource utilization can be expressed in fractional units of resource-seconds to a nearest millisecond. From step 1404, the process 1400 proceeds to step 1406.

At step 1406, resource utilizations are summed across the current set of consumable resources. From step 1406, the process 1500 proceeds to step 1408. At step 1408, a maximum theoretical utilization of the current set of consumable resources is determined. The maximum theoretical utilization corresponds to a number of clocking units that, collectively, the current set of consumable resources could have been utilized during the clocking cycle. In a typical embodiment, the maximum theoretical utilization equals the total number of resources multiplied by a length of the clocking cycle (e.g., seconds if wall time is utilized). Therefore, the maximum theoretical utilization also has units of resource-time (e.g., resource-seconds if wall time is utilized) From step 1408, the process 1400 proceeds to step 1410.

At step 1410, an actual average capacity of the current set of consumable resources is computed. The actual average capacity can equal, for example, the summed resource utilizations divided by the maximum theoretical utilization. Consequently, the actual average capacity can be represented as a percentage of the maximum theoretical utilization. From step 1410, the process 1400 proceeds to step 1412. At step 1412, the computer cluster computes, for each reservation, a product of the flow-control clocking weight (units of resources), the actual average capacity, and the length of the clocking cycle (time, e.g., in seconds). Therefore, the product can be expressed in resource-seconds From step 1412, the process 1400 proceeds to step 1414. At step 1414, for each reservation, the wait-time is decremented by the product computed at step 1412. After step 1414, the process 1400 ends.

FIG. 15 illustrates a collection 1500 of interactive processes that may be executed by a flow-control instance. The flow-control instance manages a dynamically changing set of consumable resources relative to a managed task type requiring utilization of a class of consumable resources. In a typical embodiment, the collection 1500 is used to control sharing of the set of consumable resources among a dynamically changing set of active customers. The collection 1500 may be executed by a computer cluster such as, for example, the computer cluster 100 of FIG. 1.

The collection 1500 includes a customer-needs process 1502, a reservations process 1504, a reservation-accounting process 1506, and a resource-allocation process 1508. In a typical embodiment, each process in the collection 1500 is executed in parallel by one or more computers of the computer cluster. Upon instantiation of the flow-control instance, no process of the collection 1500 is typically in execution. Execution of the collection 1500 typically begins with a first execution of the customer-needs process 1502. The customer-needs process 1500 begins at step 1502(1).

At step 1502(1), a customer-specific task group is created. In a typical embodiment, the customer-specific task group is created responsive to a request for service being received from a customer. Creation of the customer-specific task group typically involves grouping tasks, for example, by task key as described above with respect to FIGS. 3-5. It should be appreciated that the customer-specific task group might include a single task or, for example, many thousands of tasks. From step 1502(1), execution proceeds to step 1502(2) of the customer-needs process 1502.

At step 1502(2), it is determined whether the customer is a first customer in the set of active customers. If so, concurrently: (1) the reservation-accounting process 1506 is initiated; (2) the resource-allocation process 1508 is initiated; and (3) the customer-needs process proceeds to step 1502(3). If it is determined at step 1502(2) that the customer is not the first customer in the set of active customers, execution proceeds to step 1502(3). At step 1502(3), it is determined whether a total number of active customers has changed. If not, the customer-needs process 1502 proceeds to step 1504(1) of the reservations process 1504. If it is determined at step 1502(3) that the total number of active customers has changed, execution proceeds to step 1502(4).

At step 1502(4), an outer stationary distribution is computed for all active customers. The outer stationary distribution may be computed, for example, as described with respect to FIGS. 7 and 9. Accordingly, for each active customer, computing the outer stationary distribution involves computing, for each active customer, a customer-resource percentage according to a proportion of the current set of consumable resources that should be allocated to the active customer. All such customer-resource percentages should generally sum to one. In a typical embodiment, step 1502(4) results in a balanced-utilization partitioning scheme as described with respect to FIGS. 6-10. More particularly, the balanced-utilization partitioning scheme includes one partition for each active customer. From step 1502(4), execution proceeds to step 1502(5).

At step 1502(5), an effective distribution is computed for each reservation. The effective distribution can be computed as described with respect to FIGS. 7 and 9. From step 1502(5), execution proceeds to step 1502(6). At step 1502(6), a flow-control clocking weight is calculated for each reservation. In a typical embodiment, the effective distribution is a primary component of each reservation's flow-control clocking weight. As described with respect to FIGS. 7, 9, 11, and 13, each reservation's flow-control clocking weight can be calculated as a product of the effective distribution and a total number of consumable resources in the current set of consumable resources. From step 1502(6), execution proceeds to step 1504(1) of the reservations process 1504.

The reservations process 1504 begins at step 1504(1). At step 1504(1), a new reservation is added to the priority queue. The new reservation corresponds to the customer-specific task group created at step 1502(1) of the customer-needs process 1502. From step 1504(1), execution proceeds to step 1504(2). At step 1504(2), an initial value is assigned to a wait-time for the new reservation. As described with respect to FIG. 13, the flow-control instance maintains wait-times for each reservation in the priority queue. The wait-times are considered a measure of how needy the reservations are for the class of consumable resources. The initial value of the wait-time for the new reservation can be, for example, a negative value of the new reservation's effective distribution (computed at step 1502(5)). In various other embodiments, the initial value of the wait-time can be, for example, a negative value of the new reservation's flow-control clocking weight (computed at step 1502(6)).

The reservation-accounting process 1506 begins at step 1506(1). At step 1506(2), the flow-control instance waits one clocking cycle (e.g., one second). From step 1506(2), execution proceeds to step 1506(3). At step 1506(3), the wait-time for each reservation in the priority queue is updated based on the reservation's flow-control clocking weight. The update yields a new value for the wait-time. In a typical embodiment, for each reservation, this update effects a clocking of the reservation in a negative direction as described with respect to FIG. 13. An example of how the wait-time for each reservation can be clocked negatively is described with respect to FIG. 14. From step 1506(3), execution proceeds to step 1506(4). At step 1506(4), the priority queue is reordered by wait-time, where a lowest wait-time indicates a most-needy reservation and a highest wait-time indicates a least-needy reservation. From step 1506(4), execution returns to step 1506(2) and proceeds as described above.

The resource-allocation process 1508 begins at step 1508 (1). At step 1508(2), it is determined whether any consumable resources in the current set of consumable resources are free (i.e., available for use). If not, the resource-allocation process 1508 remains at step 1508(2) until a consumable resource in the current set of consumable resources is free. If it is determined at step 1508(2) that a consumable resource in the current set of consumable resources is free, execution proceeds to step 1508(3). At step 1508(3), the consumable resource is marked as "in use." From step 1508(3), execution proceeds to step 1506(5) of the reservation-accounting process 1506.

At step 1506(5), the consumable resource is assigned to a selected reservation in the priority queue that is qualified to use the consumable resource. In a typical embodiment, the selected reservation is the most-needy reservation as defined by having the lowest wait-time in the priority queue. At this point, the selected reservation is granted access to the assigned consumable resource until the selected reservation is finished, as described in greater detail below. From step 1506(5), execution proceeds to step 1504(6) of the reservations process 1504.

At step 1504(6), it is determined whether the selected reservation is still active. In a typical embodiment, the selected reservation is still active if the selected reservation includes at least one task that has not been processed to completion. If not, execution proceeds to step 1504(7). At step 1504(7), the selected reservation is removed from the priority queue. From step 1504(7), execution proceeds to step 1502(3) and continues as described above. If it is determined at step 1504(6) that the selected reservation is still active, execution proceeds to step 1504(3).

At step 1504(3), the selected reservation's wait-time is temporarily updated based on an average utilization time. The average utilization time can be represented in units of resource-time (i.e., as a product of resources and time). If wall time is utilized, the units of resource-time could, more specifically, be considered resource-seconds. The average utilization time is an average number of resource-time units (e.g., resource-seconds) that tasks grouped under the selected reservation's task key have utilized a consumable resource before yielding back the consumable resource. The average utilization time is based on previous consumable-resource assignments. If the selected reservation has not previously been assigned a consumable resource, the average utilization time may be a default value such as, for example, one resource-second. In a typical embodiment, a product of the average utilization time and the flow-control clocking weight is added to the selected reservation's wait-time. In a typical embodiment, this update prevents the selected reservation from remaining at the top of the priority queue. From step 1504(3), execution proceeds to step 1504(4).

At step 1504(4), it is determined whether a task of the selected reservation is finished with the assigned consumable resource. Execution remains at step 1504(4) until a currently executing task is finished. As each task of the selected reservation is finished, execution proceeds to step 1504(5). At step 1504(5), the selected reservation's wait-time is adjusted based on an actual utilization time (i.e., resource-time) of the finished task. The adjustment typically involves subtracting the product temporarily applied at step 1504(3) and, in its place, adding a product of the actual utilization time and one resource, thereby yielding units of resource-time (e.g., resource-seconds). For example, in various embodiments in which the actual utilization time is expressed in fractional units of wall time, the actual utilization time is precise to a nearest millisecond. In a typical embodiment, the average utilization time for the selected reservation is also updated based on the actual utilization time. From step 1504(5), execution proceeds to step 1504(6) and proceeds as described above.

FIG. 16 illustrates a collection 1600 of interactive processes that may be executed by a flow-control instance such as, for example, the flow-control instance 300 of FIG. 3. The flow-control instance manages a dynamically changing set of consumable resources relative to a managed task type requiring utilization of a class of consumable resources. In a typical embodiment, the collection 1600 is used to control sharing of the set of consumable resources among a dynamically changing set of active customers. The collection 1600 may be executed by a computer cluster such as, for example, the computer cluster 100 of FIG. 1.

In similar fashion to the collection 1500 of FIG. 15, the collection 1600 includes a customer-needs process 1602, a reservations process 1604, a reservation-accounting process 1606, and a resource-allocation process 1608. Differently than the collection 1500, the collection 1600 additionally includes a customer-priorities process 1603. In a typical embodiment, each process in the collection 1600 is executed in parallel by one or more computers of the computer cluster. Upon instantiation of the flow-control instance, no process of the collection 1600 is typically in execution. Execution of the collection 1600 typically begins with a first execution of the customer-needs process 1602. The customer-needs process 1600 begins at step 1602(1).

At step 1602(1), a customer-specific task group is created. In a typical embodiment, the customer-specific task group is created responsive to a request for service being received from a customer. Creation of the customer-specific task group typically involves grouping tasks, for example, by task key as described above with respect to FIGS. 3-5. It should be appreciated that the customer-specific task group might include a single task or, for example, many thousands of tasks. From step 1602(1), execution proceeds to step 1602(2).

At step 1602(2), it is determined whether the customer is a first customer in the set of active customers. If so, concurrently: (1) the reservation-accounting process 1606 is initiated; (2) the resource-allocation process 1608 is initiated; and (3) the customer-needs process proceeds to step 1602(3). If it is determined at step 1602(2) that the customer is not the first customer in the set of active customers, execution proceeds to step 1602(3). At step 1602(3), it is determined whether a total number of active customers has changed. If not, the customer-needs process 1602 proceeds to step 1604(1) of the reservations process 1604. If it is determined at step 1602(3) that the total number of active customers has changed, execution proceeds to step 1602(4).

At step 1602(4), an outer stationary distribution is computed for all active customers. The outer stationary distribution may be computed, for example, as described with respect to FIGS. 7, 9, and 11. Accordingly, for each active customer, computing the outer stationary distribution involves assigning, to each active customer, a customer-specific resource percentage according to a proportion of the current set of consumable resources that should be allocated to the active customer. All such customer-specific resource percentages should generally sum to one. From step 1602(4), execution proceeds to step 1603(1) of the customer-priorities process 1603.

The customer-priorities process 1603 begins at step 1603(1). At step 1603(1), an inner stationary distribution is computed for each active customer. Computation of the inner stationary distribution involves calculating a priority-based resource percentage for each priority grouping of the customer's active reservations. A priority grouping exists for each priority level at which the customer has active reservations. All such priority-based resource percentages should sum to one. The inner stationary distribution may be computed, for example, as described with respect to FIGS. 11-12.

In a typical embodiment, step 1603(1) results in a balanced-utilization partitioning scheme as described with respect to FIGS. 6-12. More particularly, the balanced-utilization partitioning scheme includes one partition for each priority grouping so that a total number of partitions equals a number of priority groupings across all customers. From step 1603(1), execution proceeds to step 1603(2). At step 1603(2), an effective distribution is computed for each reservation. The effective distribution can be computed as described with respect to FIGS. 11-12. From step 1603(2), execution proceeds to step 1603(3).

At step 1603(3), a flow-control clocking weight is calculated for each reservation. In a typical embodiment, the effective distribution is a primary component of each reservation's flow-control clocking weight. As described with respect to FIGS. 7, 9, 11, and 13, each reservation's flow-control clocking weight can be calculated as a product of the effective distribution and a total number of consumable resources in the current set of consumable resources. From step 1603(3), execution proceeds to step 1604(1) of the reservations process 1604.

The reservations process 1604 begins at step 1604(1). At step 1604(1), a new reservation is added to the priority queue. The new reservation corresponds to the customer-specific task group created at step 1602(1) of the customer-needs process 1602. From step 1604(1), execution proceeds to step 1604(2). At step 1604(2), an initial value is assigned to a wait-time for the new reservation. As described with respect to FIG. 13, the flow-control instance maintains wait-times for each reservation in the priority queue. The wait-times are considered a measure of how needy the reservations are for the class of consumable resources. The initial value of the wait-time for the new reservation can be, for example, a negative value of the new reservation's effective distribution (computed at step 1603(2)). In various other embodiments, the initial value of the wait-time can be, for example, a negative value of the new reservation's flow-control clocking weight (computed at step 1603(3)).

The reservation-accounting process 1606 begins at step 1606(1). At step 1606(2), the flow-control instance waits one clocking cycle (e.g., one second). From step 1606(2), execution proceeds to step 1606(3). At step 1606(3), the wait-time for each reservation in the priority queue is updated based on the reservation's flow-control clocking weight. This update yields a new value for the wait-time. In a typical embodiment, for each reservation, this update also effects a clocking of the reservation in a negative direction as described with respect to FIG. 13. An example of how the wait-time for each reservation can be clocked negatively is described with respect to FIG. 14. From step 1606(3), execution proceeds to step 1606(4). At step 1606(4), the priority queue is reordered by wait-time, where a lowest wait-time indicates a most-needy reservation and a highest wait-time indicates a least-needy reservation. From step 1606(4), execution returns to step 1606(2) and proceeds as described above.

The resource-allocation process 1608 begins at step 1608(1). At step 1608(2), it is determined whether any consumable resources in the current set of consumable resources are free (i.e., available for use). If not, the resource-allocation process 1608 remains at step 1608(2) until a consumable resource in the current set of consumable resources is free. If it is determined at step 1608(2) that a consumable resource in the current set of consumable resources is free, execution proceeds to step 1608(3). At step 1608(3), the consumable resource is marked as "in use." From step 1608(3), execution proceeds to step 1606(5) of the reservation-accounting process 1606.

At step 1606(5), the consumable resource is assigned to a selected reservation in the priority queue that is qualified to use the consumable resource. In a typical embodiment, the selected reservation is the most-needy reservation as defined by having the lowest wait-time in the priority queue. At this point, the selected reservation is granted access to the assigned consumable resource until the selected reservation is finished, as described in greater detail below. From step 1606(5), execution proceeds to step 1604(6) of the reservations process 1604.

At step 1604(6), it is determined whether the selected reservation is still active. In a typical embodiment, the selected reservation is still active if the selected reservation includes at least one task that has not been processed to completion. If not, execution proceeds to step 1604(7). At step 1604(7), the selected reservation is removed from the priority queue. From step 1604(7), execution proceeds to step 1602(3) and continues as described above. If it is determined at step 1604(6) that the selected reservation is still active, execution proceeds to step 1604(3).

At step 1604(3), the selected reservation's wait-time is temporarily updated based on an average utilization time. The average utilization time can be represented in units of resource-time (i.e., as a product of resources and time). If wall time is utilized, the units of resource-time could, more specifically, be considered resource-seconds. The average utilization time is an average number of resource-time units (e.g., resource-seconds) that tasks grouped under the selected reservation's task key have utilized a consumable resource before yielding back the consumable resource. The average utilization time is based on previous consumable-resource assignments. If the selected reservation has not previously been assigned a consumable resource, the average utilization time may be a default value such as, for example, one resource-second. In a typical embodiment, a product of the average utilization time and the flow-control clocking weight is added to the selected reservation's wait-time. In a typical embodiment, this update prevents the selected reservation from remaining at the top of the priority queue. From step 1604(3), execution proceeds to step 1604(4).

At step 1604(4), it is determined whether a task of the selected reservation is finished with the assigned consumable resource. Execution remains at step 1604(4) until a currently executing task is finished. As each task of the selected reservation is finished, execution proceeds to step 1604(5). At step 1604(5), the selected reservation's wait-time is adjusted based on an actual utilization time of the finished task. The adjustment typically involves subtracting the product temporarily applied at step 1604(3) and, in its place, adding a product of the actual utilization time and 'one' resource, thereby yielding units of resource-time (e.g., resource-seconds). For example, in various embodiments in which the actual utilization time is expressed in fractional units of wall time, the actual utilization time is precise to a nearest millisecond. In a typical embodiment, the average utilization time for the selected reservation is also updated based on the actual utilization time. From step 1604(5), execution proceeds to step 1604(6) and proceeds as described above.

In various embodiments, the principles described above with respect to FIGS. 1-16 can be further optimized to improve resource utilization when, for example, reservations and consumable resources are heterogeneous. For purposes of this application, resource heterogeneity refers to the existence of a plurality of distinct resource profiles. As used herein, a resource profile is a specific mix of properties that defines, at least in part, which resources a reservation can consume and/or which reservations a resource can serve. For example, in a typical embodiment, reservations requiring different mixes of properties have distinct resource profiles. For purposes of this application, each set of one or more resources that serves a same assortment of one or more resource profiles is considered a provision. In a typical embodiment, all resources within a given provision are effectively interchangeable relative to reservations that can be served.

As described above with respect to the process 400 of FIG. 4, empirical analysis (e.g., at step 404 of FIG. 4) yields, inter alia, a flow-control clocking weight for each reservation. For purposes of the description of FIGS. 17-20, flow-control clocking weights calculated as described with respect to FIGS. 1-16 may be considered ideal resource apportionments. In a homogeneous resource environment in which any resource can serve any reservation, ideal resource apportionments are typically achievable. However, in a heterogeneous resource environment in which not all resources can serve all reservations, ideal resource apportionments are often not achievable. Therefore, FIGS. 17-20 below describe optimizations that use the ideal resource apportionments as a basis for deriving new flow-control clocking weights that improve resource utilization in heterogeneous resource environments.

Figure 17:
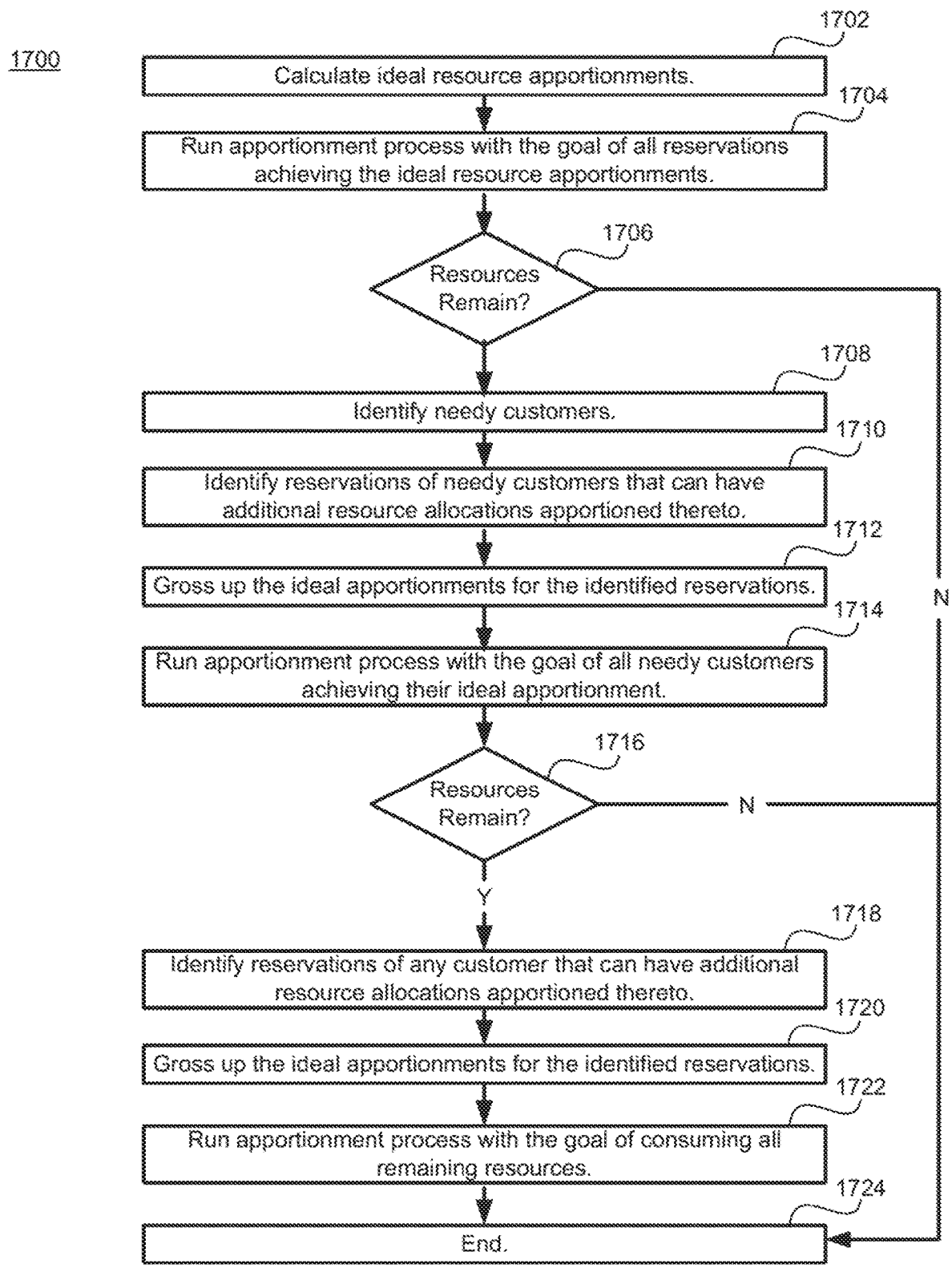
FIG. 17 illustrates a process for optimizing resource utilization in a heterogeneous resource environment.

FIG. 17 illustrates a process 1700 for optimizing resource utilization in a heterogeneous resource environment. The process 1700 may be executed by a flow-control instance such as, for example, the flow-control instance 300 of FIG. 3. The process 1700 describes: (1) an initial attempt to achieve ideal resource apportionments (step 1704); (2) a first optimization to increase resource utilization if resources remain following the initial attempt (steps 1708-1714); and (3) a second optimization to increase resource utilization if resources remain following the first optimization (steps 1718-1722). The process 1700 begins at step 1702.

At step 1702, ideal resource apportionments per reservation are calculated. In a typical embodiment, the ideal resource apportionments correspond to flow-control clocking weights that are calculated as described with respect to FIGS. 1-16. In a typical embodiment, the ideal resource apportionments are expressed in fractional units of resources and, when summed, generally equal a number of resources in a current set of consumable resources. From step 1702, the process 1700 proceeds to step 1704.

At step 1704, an apportionment process is run that attempts to apportion to each reservation its ideal resource apportionment. An example of the apportionment process will be described with respect to FIGS. 18-19. The apportionment process results in each reservation having an actual resource apportionment, expressed in fractional units of resources, that is less than or equal to its ideal resource apportionment. If the ideal resource apportionments can be attained, the apportionment process typically exhausts the current set of consumable resources. However, if the ideal resource apportionments cannot be attained relative to at least one reservation, at least a portion of the current set of resources will generally remain available for apportionment. From step 1704, the process 1700 proceeds to step 1706.

At step 1706, it is determined whether any fractional units of resources in the current set of consumable resources remain available for apportionment (i.e., unapportioned resources). In various embodiments, what constitutes existence of remaining available resources can be configurable. For example, if the remaining available resources are below a configurable threshold, it may be considered that no resources remain available for apportionment. If it is determined at step 1706 that no fractional units of resources remain available for apportionment, no further resource optimization is deemed necessary and the process 1700 proceeds to step 1724 and ends. If it is determined at step 1706 that additional resources remain available for apportionment, the process 1700 proceeds to step 1708.

Steps 1708-1714 relate to the first optimization. The first optimization attempts to increase resource utilization in a controlled fashion by awarding each customer its ideal resource apportionment (i.e. a sum of the ideal resource apportionments for that customer's reservations). In particular, at step 1708, needy customers are identified. A needy customer is typically a customer that, as a result of step 1706, has a total resource apportionment (i.e., a sum of the actual resource apportionments for that customer's reservations) that is less than the customer's ideal resource apportionment. From step 1708, the process 1700 proceeds to step 1710.

At step 1710, reservations of the needy customers that can have additional resource allocations apportioned thereto are identified. The identified reservations typically include reservations that can use at least one remaining resource of the current set of consumable resources. Because of how the apportionment process at step 1704 operates, it should be appreciated that the identified reservations generally have already achieved their ideal resource apportionments. Reservations that have not already achieved their ideal resource apportionments are not generally able to utilize any of the remaining resources. From step 1710, the process 1700 proceeds to step 1712.

At step 1712, the ideal resource apportionments for the identified reservations are grossed up in a configurable fashion based on the remaining resources. For example, in various embodiments, the remaining resources may be evenly divided among the needy customers to which the identified reservations belong, and then evenly divided among each needy customer's subset of the identified reservations. It should be appreciated that, in various embodiments, the ideal resource apportionments may also be grossed up in other ways. In that way, the ideal resource apportionment for each identified reservation is grossed up to a greater amount. From step 1712, the process 1700 proceeds to step 1714.

At step 1714, the apportionment process is re-run in an attempt to apportion to each identified reservation its grossed-up ideal resource apportionment. In a typical embodiment, the apportionment process operates as described with respect to step 1704. The apportionment process updates the actual resource apportionment for each identified reservation. In particular, for each identified reservation, the apportionment process results in the actual resource apportionment having a value (in fractional resource units) of less than or equal to the grossed-up ideal resource apportionment. The goal of the apportionment process at step 1714 is, to the extent possible, to have all needy customers reach their ideal resource apportionment. From step 1714, the process 1700 proceeds to step 1716.

At step 1716, it is determined whether, following the first optimization, any fractional units of resources remain available for apportionment. In various embodiments, what constitutes existence of remaining available resources can be configurable. For example, if the remaining available resources are below a configurable threshold, it may be considered that no resources remain available for apportionment. If it is determined at step 1716 that no fractional units of resources remain available for apportionment, no further resource optimization is deemed necessary and the process 1700 proceeds to step 1724 and ends. If it is determined at step 1716 that additional resources remain available for apportionment, the process 1700 proceeds to step 1718.

Steps 1718-1722 relate to the second optimization. In a typical embodiment, the second optimization attempts to increase resource utilization by awarding remaining resources to any reservation that can use the resources. At step 1718, reservations of any customer that can have additional resource allocations apportioned thereto are identified. From step 1718, the process 1700 proceeds to step 1720. At step 1720, the ideal resource apportionments of the reservations identified at step 1718 are grossed up in a configurable fashion. Since a goal of steps 1718-1722 is to exhaust all of the remaining resources, the ideal resource apportionments may be grossed up very high, for example, by many multiples of the ideal resource apportionments. From step 1720, the process 1700 proceeds to step 1722.

At step 1722, the apportionment process is re-run in an attempt to apportion to each reservation identified at step 1718 its grossed-up ideal resource apportionment. In a typical embodiment, the apportionment process operates as described with respect to steps 1704 and 1714. The apportionment process updates the actual resource apportionment for each identified reservation. In particular, for each identified reservation, the apportionment process results in the actual resource apportionment having a value (in fractional resource units) of less than or equal to the grossed-up ideal resource apportionment. The goal of the apportionment process at step 1722 is, to the extent possible, to apportion all remaining resources to reservations (i.e., exhaust the remaining resources). From step 1722, the process 1700 proceeds to step 1724. At step 1724, the process 1700 ends.

Following the process 1700, each reservation generally has an actual resource apportionment that may be different than its ideal resource apportionment. In a typical embodiment, the actual resource apportionments may be utilized as new flow-control clocking weights that reflect the heterogeneity of a current set of consumable resources and more efficiently utilize those resources. In that way, the new flow-control clocking weights can be used to clock reservations as described with respect to FIGS. 1-16. In addition, although the flow-control clocking weights may be different than the ideal resource apportionments, fair distribution across customers is maintained.

Figure 18:
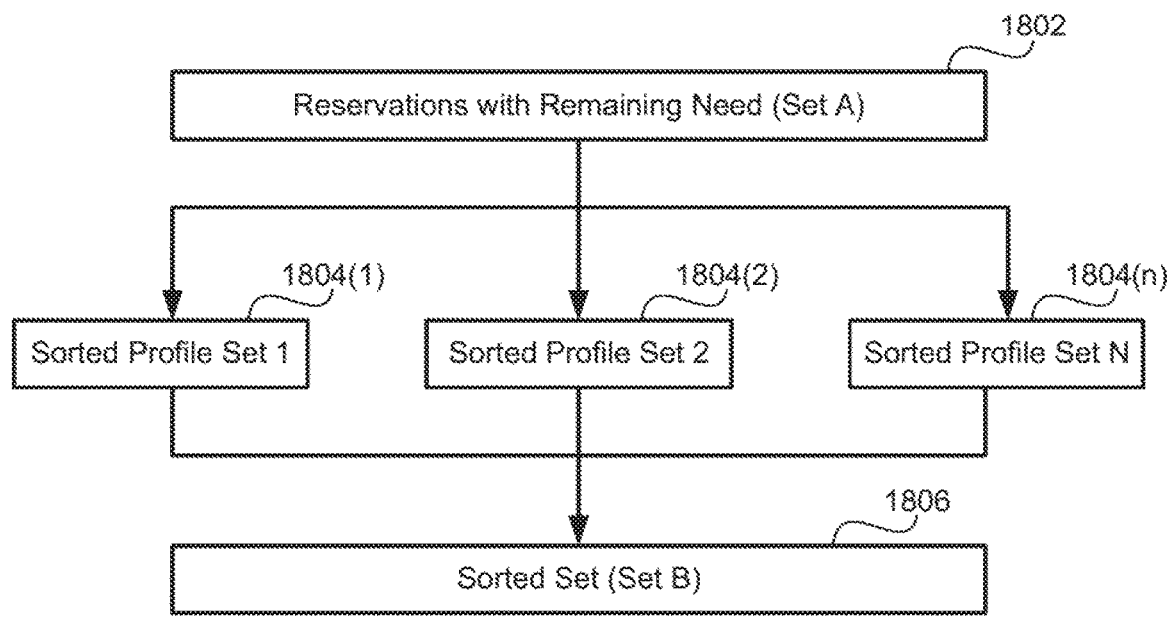
FIG. 18 describes exemplary reservation sets.

FIG. 18 describes exemplary reservation sets 1800 that, in various embodiments, can be utilized by an apportionment process. The reservation sets 1800 include a reservation set 1802 that represent reservations with remaining need (i.e., Set A). A precise definition of need typically depends upon how the apportionment process is being utilized. For example, if the apportionment process is being utilized in an initial attempt to apportion each reservation its ideal resource apportionment, need is typically defined by having an actual resource apportionment that is less than an ideal resource apportionment. By way of further example, if the apportionment process is being utilized in a first or second optimization process as described with respect to FIG. 17, need is typically defined by having an actual resource apportionment that is less than a respective grossed-up ideal resource apportionment.

The reservation sets 1800 further include sorted profile sets 1804(1), 1804(2), and 1804(n) (collectively, sorted profile sets 1804). The sorted profile sets 1804 are subdivisions of the reservation set 1802. The sorted profile sets 1804 typically include one profile set for each resource profile represented within the reservation set 1802. Each reservation of the reservation set 1802 is placed into an appropriate profile set of the sorted profile sets 1804 based on its resource profile. In addition, each of the sorted profile sets 1804 is typically sorted from lowest need to highest need, where need is defined by a difference between an ideal resource apportionment (or grossed-up ideal resource apportionment, as applicable) and an actual resource apportionment.

In addition, the reservation sets 1800 include a sorted set 1806 (i.e., Set B). The sorted set (Set B) 1806 includes an entry for each of the sorted profile sets 1804. Therefore, if the sorted profile sets 1804 were to include four profile sets, the sorted set (Set B) 1806 would include four entries (one entry for each profile set). For each sorted profile set, the entry typically includes an identifier and a smallest total need for the sorted profile set. The smallest total need can be calculated in various fashions. For example, in one embodiment, the smallest total need for each sorted profile set equals the smallest need in the sorted profile set multiplied by a cardinality of the sorted profile set.

Figure 19:
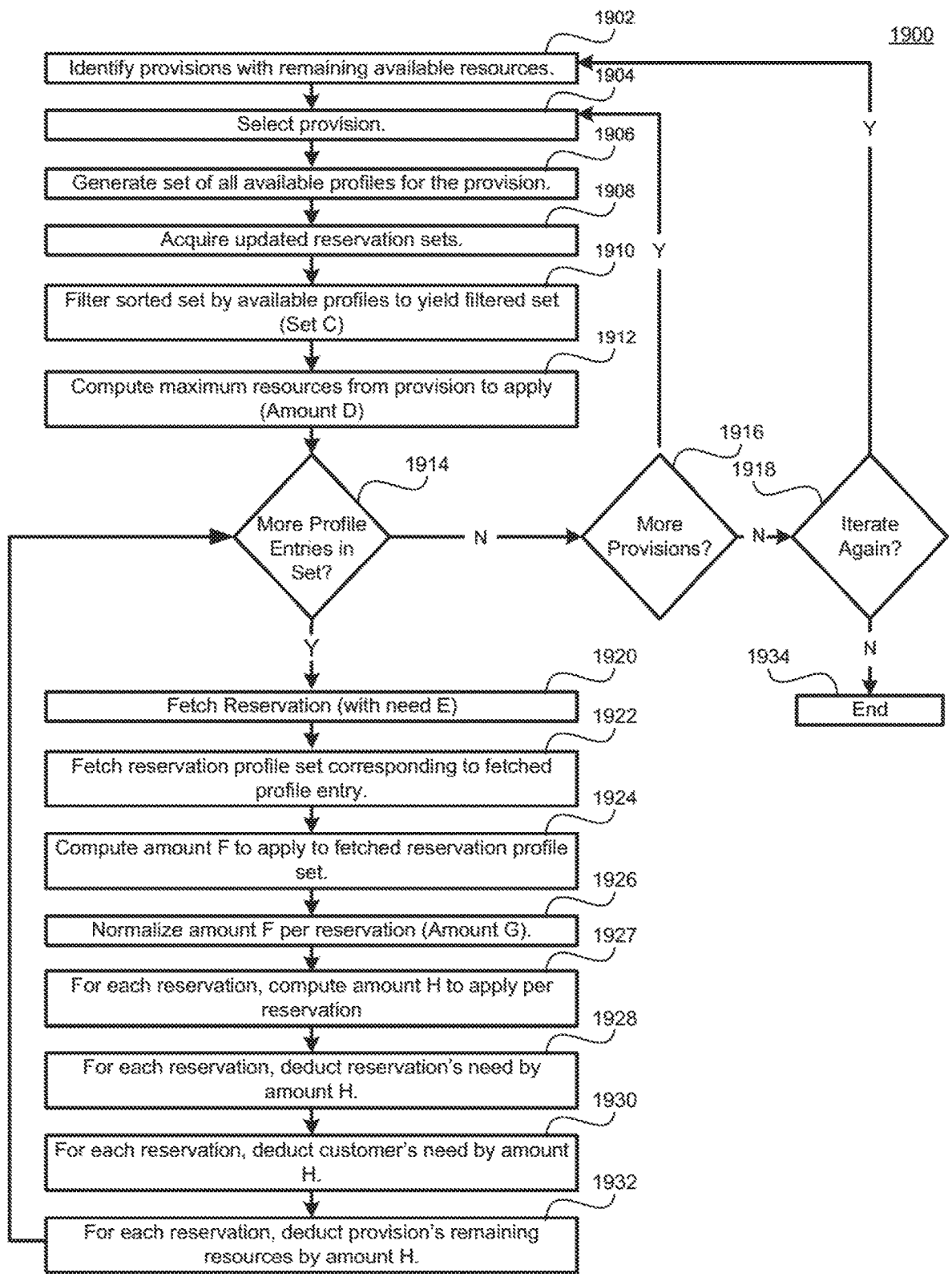
FIG. 19 describes an apportionment process.

FIG. 19 describes an apportionment process 1900. In a typical embodiment, the apportionment process 1900 is performed by a flow-control instance such as, for example, the flow-control instance 300 of FIG. 3. In various embodiments, the apportionment process 1900 may be performed as part of: (1) an initial attempt to achieve ideal resource apportionments (e.g., step 1704 of FIG. 17); (2) a first optimization to increase resource utilization if resources remain following the initial attempt (e.g., step 1714 of FIG. 17); and (3) a second optimization to increase resource utilization if resources remain following the first optimization (e.g., step 1722 of FIG. 17). The process 1900 begins at step 1902.

At step 1902, provisions with remaining available resources are identified. As noted above, a provision is a logical grouping of resources that serve a same set of resource profiles. From step 1902, the process 1900 proceeds to step 1904. At step 1904, a provision is selected. In a typical embodiment, provisions can be selected in any order. From step 1904, the process 1900 proceeds to step 1906. At step 1906, a set of all available resource profiles for the selected provision is generated. The set of available profiles typically includes all resource profiles that the selected provision can serve. From step 1906, the process 1900 proceeds to step 1908.

At step 1908, updated reservation sets are acquired. In a typical embodiment, the updated reservation sets may be similar to the reservation sets 1800 of FIG. 18. From step 1908, the process 1900 proceeds to step 1910. At step 1910, a sorted set (Set B) such as, for example, the sorted set (Set B) 1806 of FIG. 18, is filtered by the set of available profiles. Specifically, entries representing profiles that cannot be served by the selected provision are removed to yield a filtered sorted set (i.e., Set C). From step 1910, the process 1900 proceeds to step 1912. At step 1912, a maximum quantity of resources that can be applied from the provision is computed (i.e., Amount D). For example, in a typical embodiment, Amount D equals a total number of resources in the selected provision that are available for apportionment divided by a cardinality of Set C. From step 1912, the process 1900 proceeds to step 1914.

At step 1914, it is determined whether there are additional entries in the filtered sorted set (Set C) that need to be handled as part of the process 1900. In a typical embodiment, the process 1900 iterates through each profile entry in the filtered sorted set (Set C). Therefore, if the filtered sorted set (Set C) is not empty and the process 1900 has not iterated through each profile entry in the filtered sorted set (Set C), the process 1900 proceeds to step 1920. At step 1920, a profile entry is fetched from the filtered sorted set (Set C). The fetched profile entry has a smallest total need as described with respect to FIG. 18 (i.e., Amount E). From step 1920, the process 1900 proceeds to step 1922. At step 1922, the sorted profile set to which the fetched profile entry corresponds is fetched. The sorted profile set may be, for example, one of the sorted profile sets 1804 of FIG. 18. In that way, step 1922 results in all needy reservations having a resource profile corresponding to the fetched profile entry being fetched. From step 1922, the process 1900 proceeds to step 1924.

At step 1924, a resource quantity (i.e., Amount F) is computed. The resource quantity (Amount F) corresponds to a resource quantity that will be applied to reservations of the fetched sorted profile set. In various embodiments, the resource quantity (Amount F) can equal a minimum of Amount D and Amount E. From step 1924, the process 1900 proceeds to step 1926. At step 1926, the resource quantity (Amount F) is normalized per reservation to yield a normalized resource quantity (Amount G). For example, in a typical embodiment, the normalized resource quantity (Amount G) can equal Amount F divided by a cardinality of the fetched sorted profile set. From step 1926, the process 1900 proceeds to step 1927.

Steps 1927-1932 perform functionality to apportion a resource quantity to each reservation in the fetched sorted profile set. In particular, at step 1927, a resource quantity to apply (Amount H) is computed for each reservation. In a typical embodiment, the resource quantity (Amount H) is equal to a minimum of Amount G and a maximum resource quantity that a given reservation can accept without exceeding its ideal resource apportionment (or grossed-up ideal resource apportionment, as applicable). From step 1927, the process 1900 proceeds to step 1928.

At step 1928, for each reservation, the reservation's need is deducted by Amount H. From step 1928, the process 1900 proceeds to step 1930. At step 1930, for each reservation, the customer to which the reservation corresponds has its need deducted by Amount H. From step 1930, the process 1900 proceeds to step 1932. At step 1932, for each reservation, the selected provision's remaining resources are deducted by Amount H. From step 1932, the process 1900 returns to step 1914.

If it is determined at step 1914 that there are no more profile entries in the filtered sorted set (Set C) that need to be handled by the process 1900, the process 1900 proceeds to step 1916. At step 1916, it is determined whether there are additional provisions that need to be addressed by the process 1900. In a typical embodiment, the process 1900 iterates through each provision identified at step 1902. Therefore, if the process 1900 has not iterated through each provision identified at step 1902, the process 1900 returns to step 1904 to select a next provision. If it is determined at step 1916 that there are no additional provisions that need to be addressed by the process 1900, the process 1900 proceeds to step 1918.

At step 1918, it is determined whether the process 1900 should iterate again. In a typical embodiment, the process 1900 iterates again if there are still provisions with remaining available resources and needy reservations that can make use of those resources. In various embodiments, what constitutes existence of remaining available resources can be configurable. For example, if the remaining available resources of a given provision are below a configurable threshold, the given provision may be considered to have no available resources. If it is determined at step 1918 that the process 1900 should iterate again, the process 1900 returns to step 1902. Otherwise, the process 1900 proceeds to step 1934 and ends.

Figure 20:
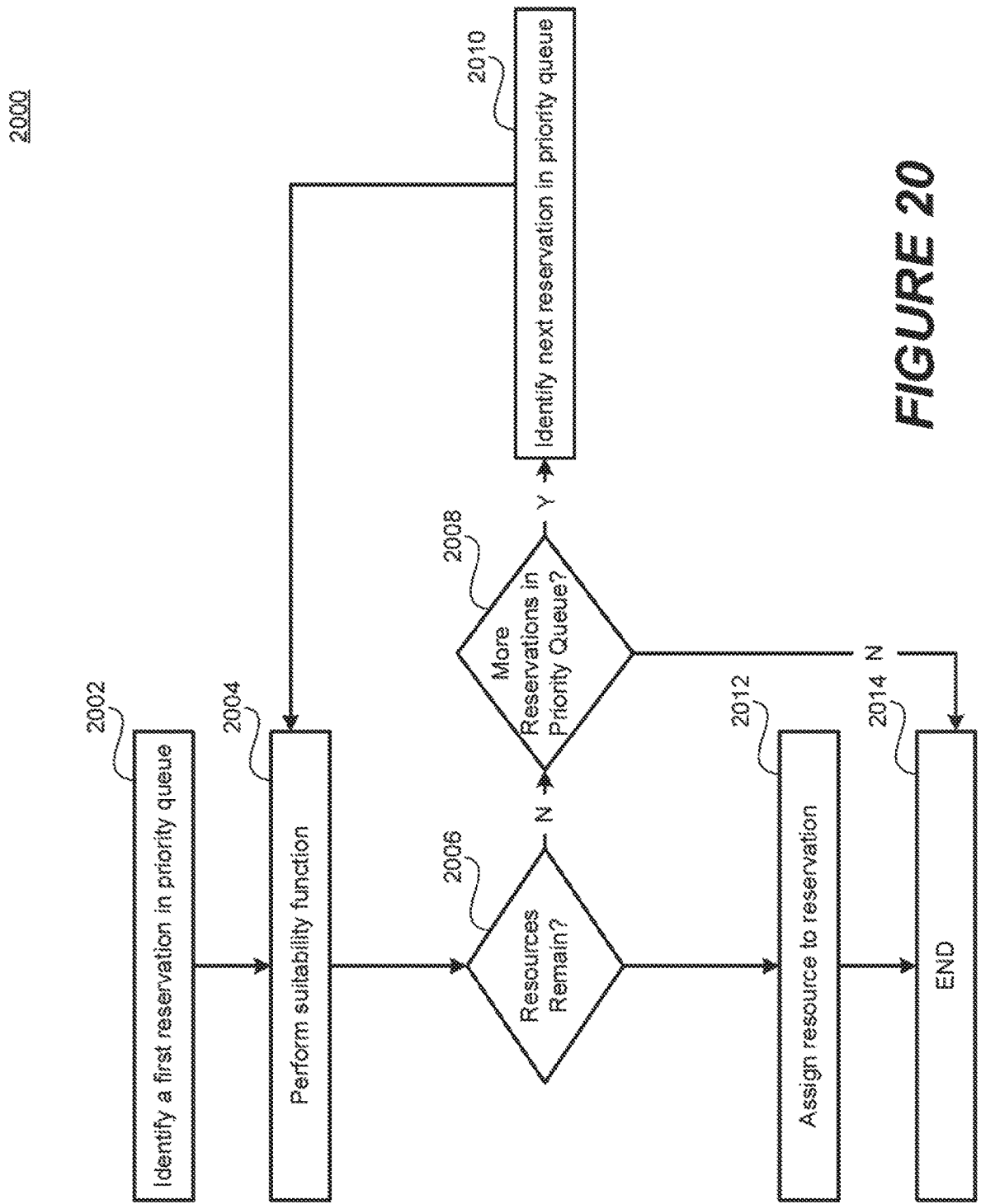
FIG. 20 describes a process for optimizing assignment of resources in a heterogeneous resource environment.

FIG. 20 describes a process 2000 for optimizing assignment of resources in a heterogeneous resource environment. In particular, the processes and methodologies described with respect to FIGS. 17-19 result in new flow-control clocking weights that can be used as described with respect to FIGS. 1-16. The process 2000 describes how an available resource can be assigned to a reservation as part of, for example, step 410 of FIG. 4, step 1506(5) of FIG. 15, and/or step 1606(5) of FIG. 16. In a typical embodiment, the process 2000 is performed by a flow-control instance such as, for example, the flow-control instance 300 of FIG. 3. The process 2000 is typically initiated by the identification of a free resource as described, for example, with respect to step 408 of FIG. 4, step 1508(2) of FIG. 15, and step 1608(2) of FIG. 16. The process 2000 begins at step 2002.

At step 2002, a first reservation is identified. In a typical embodiment, the first reservation is identified by being at a top of a priority queue such as, for example, the priority queue 1318 of FIG. 13. From step 2002, the process 2000 proceeds to step 2004. At step 2004, a suitability function is performed on the identified reservation. In a typical embodiment, the suitability function involves determining whether the identified reservation can make use of the free resource. From step 2004, the process 2000 proceeds to step 2006. At step 2006, it is determined whether the free resource has been deemed suitable for the identified reservation. If so, the process 2000 proceeds to step 2012. At step 2012, the free resource is assigned to the identified reservation. After step 2012, the process 2000 ends.

At step 2006, if it is determined that the free resource has not been deemed suitable for the identified reservation, the process 2000 proceeds to step 2008. At step 2008, it is determined whether additional reservations exist in the priority queue for which suitability has not been tested. If not, the process 2000 proceeds to step 2014 and ends. If it is determined at step 2008 that additional reservations exist in the priority queue for which suitability has not been tested, the process 2000 proceeds to step 2010. At step 2010, a next reservation in the priority queue is identified. From step 2010, the process 2000 proceeds to step 2004 and operates as described above.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic. ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
    on a computer cluster comprising a plurality of computers:
        calculating first resource apportionments from a set of resources for each of a plurality of reservations;
            wherein each reservation corresponds to one of a plurality of customers;
            wherein each customer's first resource apportionment comprises a sum of the first resource apportionments for the customer's reservations;
        running an apportionment process relative to the plurality of reservations, the running comprising attempting to apportion to each reservation its first resource apportionment;
            wherein the running yields an actual resource apportionment for each reservation;
            wherein each customer's actual resource apportionment comprises a sum of the actual resource apportionments for the customer's reservations;
        provisioning the set of resources in accordance with the actual resource apportionment for each reservation and executing one or more tasks associated with the apportionment;
        responsive to an indication of unapportioned resources following the running, performing a first optimization to increase resource utilization by at least one needy customer;
            wherein the at least one needy customer comprises one or more customers whose actual resource apportionments are less than their first resource apportionments;
            identifying one or more provisions of the set of resources that has remaining available resources;
                wherein each provision comprises resources of the set of resources that serve a same set of resource profiles;
                for each provision of the one or more provisions:
                    generating a set of available resource profiles for the provision as a plurality of profile entries for the provisioning;
                    acquiring at least one set of profile entries of the plurality of profile entries;
                    filtering the at least one set of the available resource profiles to yield at least one filtered set of at least the plurality of profile entries; and
                    for each profile entry of the at least one filtered set:
                        fetching the profile entry;
                        fetching a profile set corresponding to the fetched profile entry;
                        computing a resource quantity to apply to each reservation of the profile set; and
                        apportioning the resource quantity to each reservation of the profile set;
                    wherein the acquiring comprises:
                        creating a set of reservations, the set comprising reservations that have not yet attained at least one of the first resource apportionments and grossed-up first resource apportionments;
                        generating a profile set for each resource profile represented in the set of reservations;
                        placing each reservation of the set of reservations into a profile set based on the reservation's resource profile;
                        computing a smallest total need for each profile set; and
                        generating the at least one profile set, the at least one profile set comprising a profile entry for each profile set, each profile entry comprising a need for the profile set;
        provisioning the set of resources in accordance with the apportionment of the resource quantity to each reservation of the profile set;
        and executing one or more tasks associated with the apportionment.

2. The method of claim 1, wherein performing the first optimization comprises:
    identifying the at least one needy customer;
    identifying reservations of the at least one needy customer that can utilize at least a portion of the remaining resources;
    grossing up the first resource apportionment for each identified reservation according to the at least one needy customer's first resource apportionment; and
    re-running the apportionment process relative to the identified reservations, the re-running comprising attempting to apportion to each identified reservation its grossed-up first resource apportionment.

3. The method of claim 1, comprising, responsive to an indication of unapportioned resources following the first optimization, performing a second optimization to increase resource utilization across all customers.

4. The method of claim 3, wherein performing the second optimization comprises:
    identifying reservations of any customer that can utilize at least a portion of the remaining resources;
    grossing up the first resource apportionments for the identified reservations; and
    re-running the apportionment process relative to the identified reservations, the re-running comprising attempting to exhaust the remaining resources.

5. The method of claim 1, wherein the apportionment process comprises:
    identifying one or more provisions of the set that has remaining available resources;
        wherein each provision comprises resources of the set that serve a same set of resource profiles;
    for each provision of the one or more provisions:
        generating a set of available resource profiles for the provision;

acquiring at least one sorted set, the at least one sorted set comprising a plurality of profile entries;

filtering the at least one sorted set by the available resource profiles to yield at least one filtered sorted set; and for each profile entry of the at least one filtered sorted set:

fetching the profile entry;

fetching a sorted profile set corresponding to the fetched profile entry;

computing a resource quantity to apply to each reservation of the sorted profile set; and apportioning the resource quantity to each reservation of the sorted profile set.

6. The method of claim 5, the method comprising repeating the apportionment process responsive to at least one provision having remaining available resources and an existence of at least one needy reservation that can utilize at least a portion of the remaining available resources.

7. The method of claim 5, wherein, for each reservation, computing a resource quantity to apply comprises:

computing a maximum quantity of resources to apply from the provision;

accessing a smallest total need for the sorted profile set;

determining a minimum of the maximum quantity and the smallest total need;

normalizing the determined minimum per reservation;

calculating a maximum resource quantity that the reservation can accept without exceeding at least one of its first resource apportionment and its grossed-up first resource apportionment; and wherein the resource quantity to apply to the reservation comprises a minimum of the normalized minimum and the calculated maximum for the reservation.

8. The method of claim 5, wherein apportioning the resource quantity to each reservation comprises, for each reservation:

deducting the reservation's need by the resource quantity;

deducting a need for a customer to which the reservation corresponds by the resource quantity; and deducting an applicable provision's remaining resources by the resource quantity.

9. The method of claim 1, wherein each actual resource apportionment comprises a flow-control clocking weight.

10. The method of claim 9, comprising:

maintaining a priority queue of the plurality of reservations;

responsive to a determination that at least one resource in the set is free:

identifying a first reservation in the priority queue;

performing a suitability function on the first reservation;

responsive to a determination that the at least one resource has been deemed suitable for the first reservation, assigning the at least one resource to the first reservation; and responsive to a determination that the at least one resource has not been deemed suitable for the first reservation, identifying a next reservation in the priority queue.

11. A method comprising:

requesting from an electronic device, one or more provisions of the set of resources that has remaining available resources; and receiving one or more provisions of the set of resources that has remaining available resources, wherein the one or more provisions of the set of resources that has remaining available resources are identified by a computer cluster comprising a plurality of computers performing:

calculating first resource apportionments from a set of resources for each of a plurality of reservations;

wherein each reservation corresponds to one of a plurality of customers;

wherein each customer's first resource apportionment comprises a sum of the first resource apportionments for the customer's reservations;

running an apportionment process relative to the plurality of reservations, the running comprising attempting to apportion to each reservation its first resource apportionment;

wherein the running yields an actual resource apportionment for each reservation;

wherein each customer's actual resource apportionment comprises a sum of the actual resource apportionments for the customer's reservations;

provisioning the set of resources in accordance with the actual resource apportionment for each reservation and executing one or more tasks associated with the actual apportionment;

responsive to an indication of unapportioned resources following the running, performing a first optimization to increase resource utilization by at least one needy customer;

wherein the at least one needy customer comprises one or more customers whose actual resource apportionments are less than their first resource apportionments;

identifying one or more provisions of the set of resources that has remaining available resources;

wherein each provision comprises resources of the set of resources that serve a same set of resource profiles;

for each provision of the one or more provisions:

generating a set of available resource profiles for the provision as a plurality of profile entries for the provisioning;

acquiring at least one set of profile entries of the plurality of profile entries;

filtering the at least one set of the available resource profiles to yield at least one filtered set of at least the plurality of profile entries; and for each profile entry of the at least one filtered set:

fetching the profile entry;

fetching a profile set corresponding to the fetched profile entry;

computing a resource quantity to apply to each reservation of the profile set; and apportioning the resource quantity to each reservation of the profile set;

wherein the acquiring comprises:

creating a set of reservations, the set comprising reservations that have not yet attained at least one of the first resource apportionments and grossed-up first resource apportionments;

generating a profile set for each resource profile represented in the set of reservations;

placing each reservation of the set of reservations into a profile set based on the reservation's resource profile;

computing a smallest total need for each profile set; and generating the at least one profile set, the at least one profile set comprising a profile entry for each profile set, each profile entry comprising a need for the profile set;

provisioning the one or more provisions of the set of resources that has remaining available resources to the requesting electronic device; and executing one or more tasks associated with the provisioning.

12. The method of claim 11, wherein performing the first optimization comprises:

identifying the at least one needy customer;

identifying reservations of the at least one needy customer that can utilize at least a portion of the remaining resources;

grossing up the first resource apportionment for each identified reservation according to the at least one needy customer's first resource apportionment; and re-running the apportionment process relative to the identified reservations, the re-running comprising attempting to apportion to each identified reservation its grossed-up first resource apportionment.

13. The method of claim 11, comprising, responsive to an indication of unapportioned resources following the first optimization, performing a second optimization to increase resource utilization across all customers.

14. The method of claim 13, wherein performing the second optimization comprises:

identifying reservations of any customer that can utilize at least a portion of the remaining resources;

grossing up the first resource apportionments for the identified reservations; and re-running the apportionment process relative to the identified reservations, the re-running comprising attempting to exhaust the remaining resources.

15. The method of claim 11, wherein the apportionment process comprises:

identifying one or more provisions of the set that has remaining available resources;

wherein each provision comprises resources of the set that serve a same set of resource profiles;

for each provision of the one or more provisions:

generating a set of available resource profiles for the provision;

acquiring at least one sorted set, the at least one sorted set comprising a plurality of profile entries;

filtering the at least one sorted set by the available resource profiles to yield at least one filtered sorted set; and for each profile entry of the at least one filtered sorted set:

fetching the profile entry;

fetching a sorted profile set corresponding to the fetched profile entry;

computing a resource quantity to apply to each reservation of the sorted profile set; and apportioning the resource quantity to each reservation of the sorted profile set.

16. The method of claim 11, the method comprising repeating the apportionment process responsive to at least one provision having remaining available resources and an existence of at least one needy reservation that can utilize at least a portion of the remaining available resources.

17. The method of claim 16, wherein, for each reservation, computing a resource quantity to apply comprises:

computing a maximum quantity of resources to apply from the provision;

accessing a smallest total need for the sorted profile set;

determining a minimum of the maximum quantity and the smallest total need;

normalizing the determined minimum per reservation;

calculating a maximum resource quantity that the reservation can accept without exceeding at least one of its first resource apportionment and its grossed-up first resource apportionment; and wherein the resource quantity to apply to the reservation comprises a minimum of the normalized minimum and the calculated maximum for the reservation.

18. The method of claim 16, wherein apportioning the resource quantity to each reservation comprises, for each reservation:

deducting the reservation's need by the resource quantity;

deducting a need for a customer to which the reservation corresponds by the resource quantity; and deducting an applicable provision's remaining resources by the resource quantity.

19. The method of claim 11, wherein each actual resource apportionment comprises a flow-control clocking weight.

20. The method of claim 19, comprising:

maintaining a priority queue of the plurality of reservations;

responsive to a determination that at least one resource in the set is free:

identifying a first reservation in the priority queue;

performing a suitability function on the first reservation;

responsive to a determination that the at least one resource has been deemed suitable for the first reservation, assigning the at least one resource to the first reservation; and responsive to a determination that the at least one resource has not been deemed suitable for the first reservation, identifying a next reservation in the priority queue.

* * * * *